US012020845B2

(12) United States Patent

Yamauchi et al.

(10) Patent No.: US 12,020,845 B2

(45) Date of Patent: Jun. 25, 2024

(54) INDUCTOR COMPONENT

(71) Applicant: Murata Manufacturing Co., Ltd., Kyoto-fu (JP)

(72) Inventors: Kouji Yamauchi, Nagaokakyo (JP); Yoshimasa Yoshioka, Nagaokakyo (JP); Keisuke Kunimori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 678 days.

(21) Appl. No.: 17/037,490

(22) Filed: Sep. 29, 2020

(65) Prior Publication Data

US 2021/0104353 A1 Apr. 8, 2021

(30) Foreign Application Priority Data

Oct. 3, 2019 (JP) ................................ 2019-183025

(51) Int. Cl.

*H01F 27/28* (2006.01)
*H01F 17/00* (2006.01)
*H01F 27/29* (2006.01)

(52) U.S. Cl.

CPC ..... *H01F 27/2823* (2013.01); *H01F 17/0013* (2013.01); *H01F 27/292* (2013.01); *H01F 2017/0066* (2013.01)

(58) Field of Classification Search

CPC ............ H01F 27/2823; H01F 17/0013; H01F 27/292; H01F 2017/0066

See application file for complete search history.

(56) References Cited

U.S. PATENT DOCUMENTS 5,892,415 A * 4/1999 Okamura ................ H01P 7/084 333/175
6,191,667 B1 * 2/2001 Takenaka ............ H01F 17/0006 336/232
6,294,967 B1 * 9/2001 Hirai .......................... H01P 1/20
6,424,235 B1 * 7/2002 Kato .................... H03H 7/1775 333/184

(Continued)

FOREIGN PATENT DOCUMENTS

CN 1241010 A 1/2000
CN 106062903 A 10/2016

(Continued)

*Primary Examiner* — Malcolm Barnes

(74) *Attorney, Agent, or Firm* — Studebaker & Brackett PC

(57) ABSTRACT

An inductor component includes a main body, a first inductor wiring located inside the main body and extending on a virtual plane, and a second inductor wiring located inside the main body and extending in parallel to the virtual plane. The inductor component includes a third inductor wiring located between the first inductor wiring and the second inductor wiring inside the main body and extending in parallel to the virtual plane. The inductor component includes vertical wirings passing through the inside of the main body from each of the first to third inductor wirings to a surface of the main body in a direction perpendicular to the virtual plane. The third inductor wiring is a low-resistance inductor wiring having a DC electrical resistance smaller than those of the first inductor wiring and the second inductor wiring.

20 Claims, 18 Drawing Sheets

(56) References Cited

U.S. PATENT DOCUMENTS

| | | | | |
|---|---|---|---|---|
| 6,437,666 | B1 * | 8/2002 | Matsumura | H01P 7/084<br>333/184 |
| 11,631,526 | B2 * | 4/2023 | Tominaga | H01F 17/0013<br>336/200 |
| 2016/0372246 | A1 * | 12/2016 | Otsubo | H01F 27/245 |
| 2019/0206611 | A1 * | 7/2019 | Matsumoto | H01F 17/04 |

FOREIGN PATENT DOCUMENTS

| | | | | |
|---|---|---|---|---|
| JP | 2000-021633 | A | | 1/2000 |
| JP | 2002-110432 | A | | 4/2002 |
| JP | 2008078833 | A | * | 4/2008 |

* cited by examiner

INDUCTOR COMPONENT

CROSS-REFERENCE TO RELATED APPLICATION

This application claims benefit of priority to Japanese Patent Application No. 2019-183025, filed Oct. 3, 2019, the entire content of which is incorporated herein by reference.

BACKGROUND

Technical Field

The present disclosure relates to inductor components.

Background Art

As an inductor component mounted on an electronic device, for example, as described in Japanese Unexamined Patent Application Publication No. 2002-110432, there is an inductor component that configures an inductor array including a main body in which a magnetic material layer as a sintered body of ferrite is laminated, and a plurality of inductor wirings located on the same virtual plane inside the main body.

SUMMARY

In the inductor component configuring the inductor array as described above, generally, in the plurality of inductor wirings, wiring widths and line lengths are equally formed, and DC electrical resistances are equivalent. In a case where the inductor component includes equal to or more than three inductor wirings aligned on the same virtual plane, the inductor wirings located at both ends in an arrangement direction of the inductor wiring are adjacent to the inductor wiring only on one side in the arrangement direction. On the other hand, the inductor wiring located between the inductor wirings at both ends is adjacent to the inductor wiring on both sides in the arrangement direction of the inductor wiring. Therefore, in a case where a current flows through each of the inductor wirings in the same manner, the inductor wiring located between the inductor wirings at both ends has a problem in that heat tends to be accumulated in the surrounding and a temperature becomes high as compared with the inductor wiring located at both ends.

In addition, in such an inductor component, a bottom electrode type may be employed for reduction in size and height. The bottom electrode type inductor component further includes a vertical wiring passing through the main body in a direction perpendicular to a plane in which the inductor wiring extends from each of the inductor wirings to a surface of the main body, and exposes an external terminal connected to the vertical wiring only to at least one of an upper surface and a lower surface of the inductor component. When such an inductor component is connected to a circuit board by solder, the solder adheres only to a bottom surface side, and thus a mounting area on the circuit board can be reduced.

However, when the bottom electrode type inductor component is actually manufactured, the inventors of the present application have found that the current tends to concentrate on a connection portion between the inductor component and the circuit board (i.e., a portion of the solder connecting the external terminal and the circuit board), so that electrochemical migration easily occurs in the connection portion.

Here, the electrochemical migration lifetime equation (Black empirical formula) in a thin film is shown below.

$$L = \frac{A}{J^a} \times \exp\left(\frac{E_a}{KT}\right)$$

A represents a proportionality constant, J represents a current density [A/cm$^2$], n represents a current density dependency coefficient, $E_a$ represents an activation energy [J] of the lifetime, K represents a Boltzmann constant (1.38×10$^{23}$ [J/K]), and T represents an absolute temperature [K].

It can be seen from the above-described electrochemical migration lifetime equation that the lifetime becomes shorter as the temperature becomes higher. In addition, it can be seen that the lifetime has a high temperature dependence.

As described above, the temperature of the inductor wiring located between the inductor wirings at both ends tends to be high. Therefore, in the solder for connecting the vertical wiring connected to the inductor wiring and the external terminal to the circuit board, electrochemical migration is particularly likely to occur.

Accordingly, the present disclosure provides an inductor component capable of suppressing a decrease in reliability due to heat.

An inductor component of an aspect of the present disclosure includes a main body; a first inductor wiring located inside the main body and extending on a virtual plane; a second inductor wiring located inside the main body and extending in parallel to the virtual plane; a third inductor wiring located between the first inductor wiring and the second inductor wiring inside the main body and extending in parallel to the virtual plane; and vertical wirings passing through an inside of the main body from each of the first to third inductor wirings to a surface of the main body in a direction perpendicular to the virtual plane, in which the third inductor wiring is a low-resistance inductor wiring. The low-resistance inductor wiring has a DC electrical resistance smaller than DC electrical resistances of the first inductor wiring and the second inductor wiring.

According to the above-described aspect, even in a case where a current flows through the first to third inductor wirings in the same manner, the third inductor wiring, in which heat particularly tends to be accumulated, is hard to generate heat as compared with the first and second inductor wirings. Therefore, it is possible to suppress a temperature becoming locally higher in the vicinity of the third inductor wiring than in the vicinity of the first inductor wiring and the second inductor wiring, and it is possible to suppress a decrease in reliability due to heat.

Note that in this specification, the term "inductor wiring" means to give inductance to the inductor component by generating a magnetic flux when a current flows therethrough, and the inductance is not particularly limited to the structure, shape, material, and the like of the inductor component.

An inductor component according to an aspect of the present disclosure includes a main body; inductor wirings aligned in a matrix having rows and columns form inside the main body; and vertical wirings passing through an inside of the main body from each of the inductor wirings to a surface of the main body in a column arrangement direction of the inductor wiring in each of the columns. In each of the rows, the equal to or more than three inductor wirings are arranged, and the inductor wiring closer to an intermediate position of the two inductor wirings located at both ends of the row has a smaller DC electrical resistance. In each of the columns, the equal to or more than three inductor wirings are arranged, and the inductor wiring closer to an intermediate position of the two inductor wirings located at both ends of the column has a smaller DC electrical resistance.

According to the above-described aspect, even in a case where a current flows through each of the inductor wirings in each row in the same manner, in the inductor wirings in each row, the inductor wiring closer to an intermediate position, in which heat particularly tends to be accumulated, of two inductor wirings located at both ends of the row is hard to generate heat. Therefore, in the inductor wirings in each row, it is possible to suppress a temperature becoming locally high in the vicinity of the inductor wiring located between two inductor wirings located at both ends of the row.

Similarly, even in a case where a current flows through each inductor wiring in each column in the same manner, in the inductor wirings in each column, the inductor wiring closer to an intermediate position, in which heat particularly tends to be accumulated, of two inductor wirings located at both ends of the column is hard to generate heat. Therefore, in the inductor wirings of each column, it is possible to suppress a temperature becoming locally high in the vicinity of the inductor wiring located between two inductor wirings located at both ends of the column.

From these facts, it is possible to suppress a decrease in reliability due to heat.

Other features, elements, characteristics and advantages of the present disclosure will become more apparent from the following detailed description of some embodiments of the present disclosure with reference to the attached drawings.

DETAILED DESCRIPTION

Hereinafter, an embodiment of an inductor component will be described. Note that, in some cases, constituent elements in the accompanying drawings are illustrated in an enlarged manner for the sake of easy understanding. The dimensional ratio of the constituent elements may differ from the actual one or that in another figure. In addition, although hatching is given in a cross-sectional view, hatching of some constituent elements may be omitted for the sake of easy understanding.

First Embodiment

Figure 1:
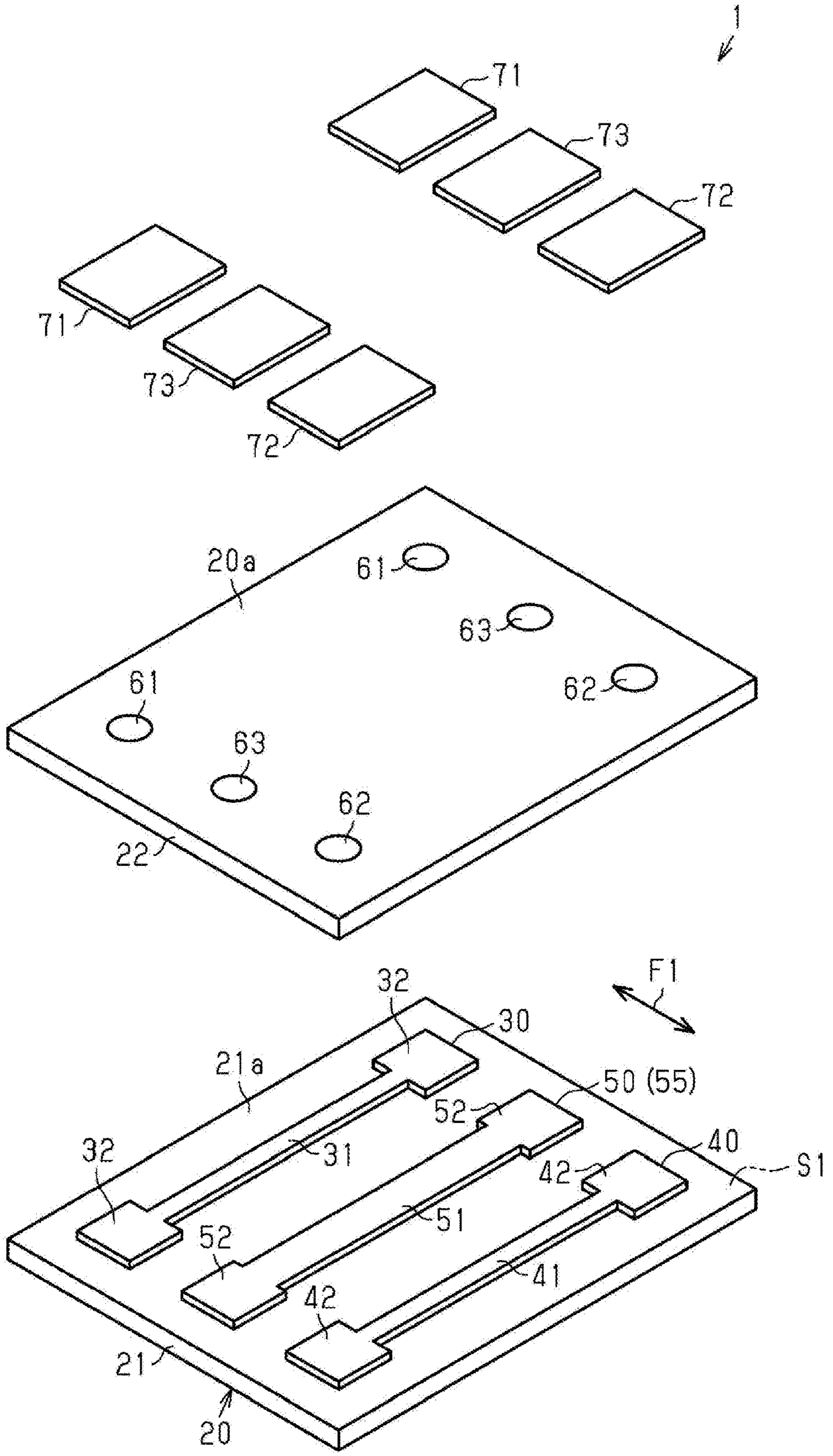
FIG. 1 is an exploded perspective view of an inductor component according to a first embodiment.

An inductor component 1 illustrated in FIG. 1 is, for example, a surface-mounted inductor component mounted in an electronic device such as a personal computer, a DVD player, a digital camera, a television, a mobile phone, and car electronics.

As illustrated in FIG. 1, the inductor component 1 includes a main body 20, a first inductor wiring 30 located inside the main body 20 and extending on a virtual plane S1, and a second inductor wiring 40 located inside the main body 20 and extending on the virtual plane S1 (parallel to the virtual plane S1). In addition, the inductor component 1 also includes a third inductor wiring 50 that is located between the first inductor wiring 30 and the second inductor wiring 40 inside the main body 20, and extends on the virtual plane S1 (parallel to the virtual plane S1). Further, the inductor component 1 includes vertical wirings 61, 62, and 63 passing through an inside of the main body 20 in a direction perpendicular to the virtual plane S1 from each of the first to third inductor wirings 30, 40, and 50 to a surface of the main body 20. The third inductor wiring 50 is a low-resistance inductor wiring 55 having a DC electrical resistance smaller than those of the first inductor wiring 30 and the second inductor wiring 40.

Figure 2A:
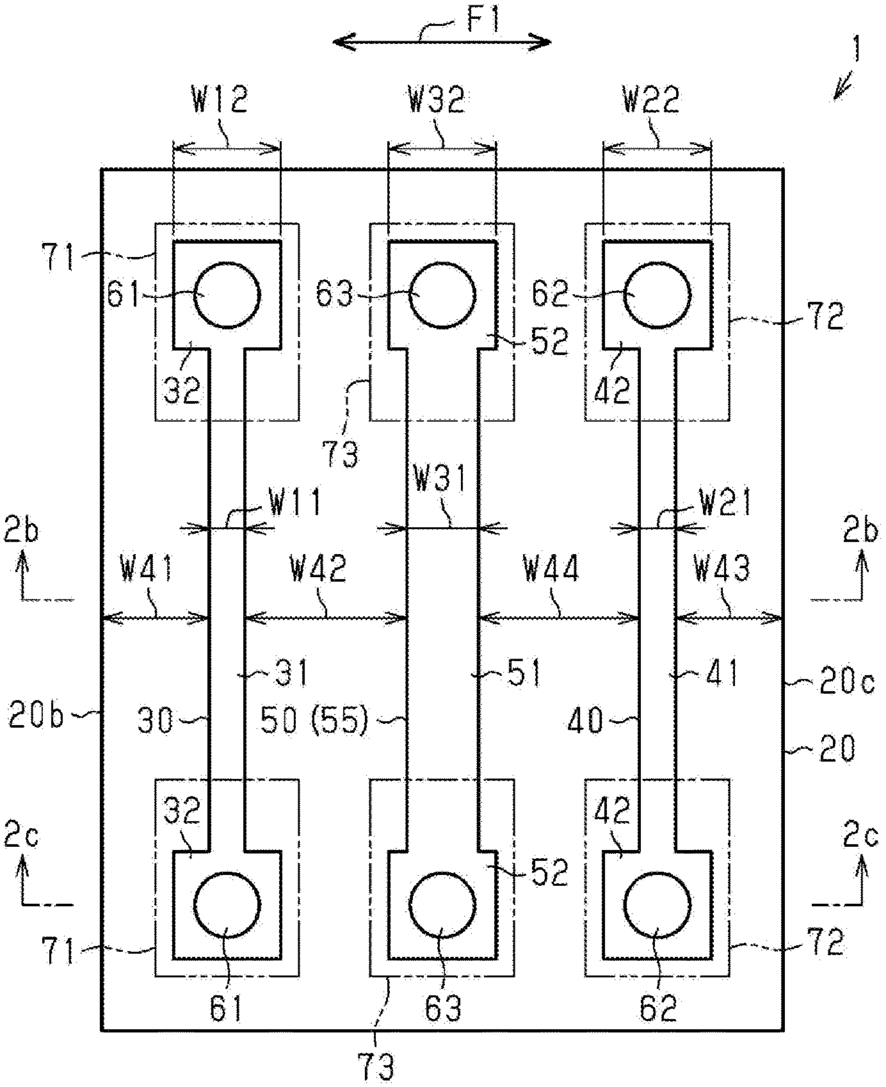
FIG. 2A is a perspective plan view of the inductor component according to the first embodiment.
Figure 2B:
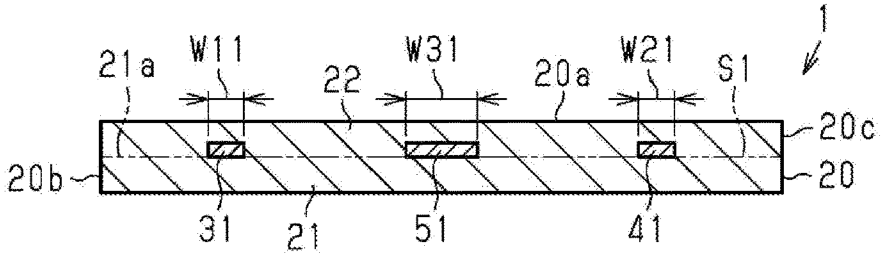
FIG. 2B is a cross-sectional view of the inductor component (a cross-sectional view taken along a line 2*b*-2*b* in FIG. 2A)

As illustrated in FIG. 1, FIG. 2A, and FIG. 2B, the inductor component 1 of the present embodiment is a stacked inductor component. The inductor component 1 includes the main body 20, the first to third inductor wirings 30, 40, and 50, and the first to third vertical wirings 61 to 63.

The main body 20 has a substantially rectangular parallelepiped shape. In the present embodiment, an upper surface 20*a* of the main body 20 is a mounting surface that faces a circuit board when the inductor component 1 is mounted on the circuit board.

The main body 20 is a multilayer body in which a material layer is laminated. In the present embodiment, the main body 20 is a multilayer body in which a plurality of magnetic material layers 21 and 22 is laminated. Each of the magnetic material layers 21 and 22 has a substantially rectangular plate-like shape. The magnetic material layers 21 and 22 are a sintered body, and as a material thereof, a magnetic material such as ferrite, a non-magnetic material such as glass, alumina, or the like can be used. The magnetic material layers 21 and 22 are a sintered body, whereby the inductor wirings 30, 40, and 50 can be formed with high quality and at a low cost. Note that the magnetic material layers 21 and 22 are not limited to the sintered body, and a magnetic material that does not melt at a low temperature may also be used as the material of the magnetic material layers 21 and 22.

The first inductor wiring 30, the second inductor wiring 40, and the third inductor wiring 50 are located inside the main body 20. The first inductor wiring 30, the second inductor wiring 40, and the third inductor wiring 50 are provided on the main surface 21*a* of the magnetic material layer 21. The first inductor wiring 30, the second inductor wiring 40, and the third inductor wiring 50 are provided so as to be located on the same virtual plane S1. Note that in the present embodiment, the virtual plane S1 coincides with the main surface 21*a* of the magnetic material layer 21. Further, the third inductor wiring 50 is located between the first inductor wiring 30 and the second inductor wiring 40, and the first to third inductor wirings 30, 40, and 50 are aligned at equal intervals along one direction parallel to the virtual plane S1. An arrangement direction F1, which is a direction in which the first to third inductor wirings 30, 40, and 50 are arranged, corresponds to a left-right direction in FIG. 2A. Further, the first to third inductor wirings 30, 40, and 50 have a substantially linear shape extending in a direction perpendicular to the arrangement direction F1 on the virtual plane S1. The direction in which the first to third inductor wirings 30, 40, and 50 extend corresponds to a vertical direction in FIG. 2A.

Here, out of both end surfaces of the main body 20 in the arrangement direction F1, an end surface on the first inductor wiring 30 side is referred to as a first end surface 20*b*, and an end surface on the second inductor wiring 40 side is referred to as a second end surface 20*c*. The first inductor wiring 30 is adjacent to the first end surface 20*b* in the arrangement direction F1. In addition, the second inductor wiring 40 is adjacent to the second end surface 20*c* in the arrangement direction F1. That is, another inductor wiring is not provided between the first inductor wiring 30 and the first end surface 20*b*, and another inductor wiring is not provided between the second inductor wiring 40 and the second end surface 20*c*. The first inductor wiring 30 and the second inductor wiring 40 are inductor wirings located at the outermost periphery, i.e., at both ends in the arrangement direction F1, of all the inductor wirings included in the inductor component 1.

The first inductor wiring 30 includes a first wiring portion 31 and a first connection portion 32 provided at both ends of the first wiring portion 31.

The first wiring portion 31 has a substantially belt-like shape extending linearly along a direction orthogonal to the arrangement direction F1 and parallel to the virtual plane S1. The first wiring portion 31 is formed to have a constant wiring width W11 and a constant thickness. The first connection portion 32 is formed integrally with the first wiring portion 31. In the present embodiment, each first connection portion 32 has a substantially quadrangular shape of a substantially square (i.e., a state illustrated in FIG. 2A) viewed from a direction perpendicular to the virtual plane S1. A wiring width W12 of the first connection portion 32 (a width in the same direction as a wiring width direction of the first wiring portion 31) is larger than the wiring width W11 of the first wiring portion 31. That is, a boundary between the first wiring portion 31 and the first connection portion 32 is a place where the wiring width changes. Further, a center position in a wiring width direction of the first connection portion 32 in the arrangement direction F1 (the same as the arrangement direction F1 in the present embodiment) coincides with a center position in the wiring width direction of the first wiring portion 31 in the arrangement direction F1. That is, the first wiring portion 31 extends from a central portion in the wiring width direction of one first connection portion 32 to a central portion in the wiring width direction of another first connection portion 32.

The second inductor wiring 40 extends parallel to the virtual plane S1. The second inductor wiring 40 includes a second wiring portion 41 and a second connection portion 42 provided at both ends of the second wiring portion 41, and has the same shape and the same size as that of the first inductor wiring 30.

The second wiring portion 41 has a substantially belt-like shape extending linearly along a direction orthogonal to the arrangement direction F1 and parallel to the virtual plane S1. The second wiring portion 41 extends in parallel to the first wiring portion 31. Further, the second wiring portion 41 is formed to have a constant wiring width W21 and a constant thickness. The second wiring portion 41 has a wiring width, a thickness, and a line length equal to those of the first wiring portion 31.

The second connection portion 42 is formed integrally with the second wiring portion 41. In the present embodiment, each second connection portion 42 has a substantially quadrangular shape of a substantially square shape (i.e., a state illustrated in FIG. 2A) viewed from a direction perpendicular to the virtual plane S1, the shape being the same as that of the first connection portion 32. The second connection portion 42 has the same size as that of the first connection portion 32, and has a thickness equal to that of the first connection portion 32. Further, a wiring width W22 of the second connection portion 42 (a width in the same direction as a wiring width direction of the second wiring portion 41) is larger than the wiring width W21 of the second wiring portion 41. That is, a boundary between the second wiring portion 41 and the second connection portion 42 is a place where the wiring width changes. Further, a center position in a wiring width direction of the second connection portion 42 in the arrangement direction F1 coincides with a center position in the wiring width direction of the second wiring portion 41 in the arrangement direction F1. That is, the second wiring portion 41 extends from a central portion in the wiring width direction of one second connection portion 42 to a central portion in the wiring width direction of another second connection portion 42.

The third inductor wiring 50 extends parallel to the virtual plane S1. The third inductor wiring 50 is the low-resistance inductor wiring 55 having a DC electrical resistance smaller than those of the first inductor wiring 30 and the second inductor wiring 40. In the present disclosure, the low-resistance inductor wiring means the inductor wiring having a DC electrical resistance smaller than those of the first inductor wiring and the second inductor wiring. The third inductor wiring 50 includes a third wiring portion 51 and a third connection portion 52 provided at both ends of the third wiring portion 51. Note that, since the third inductor wiring 50 is the low-resistance inductor wiring 55, the third wiring portion 51 corresponds to an example of a low-resistance wiring portion, and the third connection portion 52 corresponds to an example of a low-resistance connection portion.

The third wiring portion 51 has a substantially belt-like shape extending linearly along a direction orthogonal to the arrangement direction F1 and parallel to the virtual plane S1. The third wiring portion 51 extends in parallel to the first wiring portion 31 and the second wiring portion 41. The third wiring portion 51 is formed to have a constant wiring width W31 and a constant thickness. Further, the third wiring portion 51 has a line length and a thickness equal to those of the first wiring portion 31 and the second wiring portion 41.

At least a part of the low-resistance inductor wiring 55 of the present embodiment has a larger cross-sectional area (an area of a cross-section perpendicular to a direction in which a current flows) than those of the first inductor wiring 30 and the second inductor wiring 40. In the present embodiment, at least a part of the low-resistance inductor wiring 55 has the wiring width larger than those of the first inductor wiring 30 and the second inductor wiring 40, whereby a cross-sectional area is formed to be larger than those of the first inductor wiring 30 and the second inductor wiring 40. Specifically, the third wiring portion 51 of the third inductor wiring 50, which is the low-resistance inductor wiring 55, has a larger wiring width than those of the first wiring portion 31 of the first inductor wiring 30 and the second wiring portion 41 of the second inductor wiring 40. That is, the wiring width W31 of the third wiring portion 51 is larger than the wiring width W11 of the first wiring portion 31 and the wiring width W21 of the second wiring portion 41. As described above, in the third inductor wiring 50 of the present embodiment, since the wiring width W31 of the third wiring portion 51 is larger than the wiring width W11 of the first wiring portion 31 and the wiring width W21 of the second wiring portion 41, the DC electrical resistance is smaller than those of the first inductor wiring 30 and the second inductor wiring 40.

The third connection portion 52 is formed integrally with the third wiring portion 51. In the present embodiment, each third connection portion 52 has a substantially quadrangular shape of a substantially square shape (i.e., a state illustrated in FIG. 2A) viewed from a direction perpendicular to the virtual plane S1, the shape being the same as those of the first connection portion 32 and the second connection portion 42. The third connection portion 52 has the same size as those of the first connection portion 32 and the second connection portion 42, and has a thickness equal to those of the first connection portion 32 and the second connection portion 42. Further, a wiring width W32 of the third connection portion 52 (a width in the same direction as a wiring width direction of the third wiring portion 51) is thicker than the wiring width W31 of the third wiring portion 51. That is, a boundary between the third wiring portion 51 and the third connection portion 52 is a place where the wiring width changes. Further, a center position in a wiring width direction of the third connection portion 52 in the arrangement direction F1 coincides with a center position in the wiring width direction of the third wiring portion 51 in the arrangement direction F1. That is, the third wiring portion 51 extends from a central portion in the wiring width direction of one third connection portion 52 to a central portion in the wiring width direction of another third connection portion 52.

One first to third connection portions 32, 42, and 52 (upper connection portions in FIG. 2A) of the first to third inductor wirings 30, 40, and 50 have equal positions in a direction perpendicular to the arrangement direction F1 and parallel to the virtual plane S1 (in the vertical direction in FIG. 2A). Therefore, the one first to third connection portions 32, 42, and 52 of the first to third inductor wirings 30, 40, and 50 are aligned along the arrangement direction F1. Further, the first to third connection portions 32, 42, and 52 are arranged at equal intervals along the arrangement direction F1. Similarly, the other first to third connection portions 32, 42, and 52 (lower connection portions in FIG. 2A) of the first to third inductor wirings 30, 40, and 50 have equal positions in a direction perpendicular to the arrangement direction F1 and parallel to the virtual plane S1. Therefore, the other first to third connection portions 32, 42, and 52 of the first to third inductor wirings 30, 40, and 50 are aligned along the arrangement direction F1. Further, the first to third connection portions 32, 42, and 52 are arranged at equal intervals along the arrangement direction F1.

The main body 20 serves as a magnetic path through which magnetic flux passes, the magnetic flux being generated when a current flows through the first to third inductor wirings 30, 40, and 50. As a result, a significant inductance is applied to the inductor component 1, and impedance is generated to a signal passing through the first to third inductor wirings 30, 40, and 50. Therefore, the inductor component 1 serves as a noise countermeasure for causing the main body 20 to consume a high-frequency noise or the like superimposed on the signal as a magnetic loss. However, when the inductance is given, the inductor component 1 has no limitation in the function thereof, and may include functions such as impedance matching, filtering, resonators, smoothing, rectifying, power storage, transformation, distribution, coupling, conversion, and the like.

A distance W41 between the first wiring portion 31 and the first end surface 20*b* of the main body 20 is shorter than a distance W42 between the third wiring portion 51 of the low-resistance inductor wiring 55 (third inductor wiring 50) adjacent to the first inductor wiring 30 and the first wiring portion 31. In the main body 20, a portion between the first wiring portion 31 and the first end surface 20*b* is a portion that serves as a magnetic path of an inductor formed of the first inductor wiring 30. Additionally, in the main body 20, a portion between the third wiring portion 51 of the low-resistance inductor wiring 55 adjacent to the first inductor wiring 30 and the first wiring portion 31 is a portion that serves as a magnetic path of an inductor formed of the first inductor wiring 30. Therefore, as viewed from a direction perpendicular to the virtual plane S1, as for the inductor formed of the first inductor wiring 30, a width of the magnetic path on the first end surface 20*b* side with respect to the first inductor wiring 30 is narrower than a width of the magnetic path on the third inductor wiring 50 side with respect to the first inductor wiring 30.

Further, a distance W43 between the second wiring portion 41 and the second end surface 20*c* of the main body 20 is shorter than a distance W44 between the third wiring portion 51 of the low-resistance inductor wiring 55 (third inductor wiring 50) adjacent to the second inductor wiring 40 and the second wiring portion 41. In the main body 20, a portion between the second wiring portion 41 and the second end surface 20*c* is a portion that serves as a magnetic path of an inductor formed of the second inductor wiring 40. Additionally, in the main body 20, a portion between the third wiring portion 51 of the low-resistance inductor wiring 55 adjacent to the second inductor wiring 40 and the second wiring portion 41 is a portion that serves as a magnetic path of an inductor formed of the second inductor wiring 40. Therefore, as viewed from a direction perpendicular to the virtual plane S1, as for the inductor formed of the second inductor wiring 40, a width of the magnetic path on the second end surface 20*c* side with respect to the second inductor wiring 40 is narrower than a width of the magnetic path on the third inductor wiring 50 side with respect to the second inductor wiring 40.

In addition, in the present embodiment, the distance W42 between the first wiring portion 31 of the first inductor wiring 30 and the third wiring portion 51 of the third inductor wiring 50 is equal to the distance W44 between the second wiring portion 41 of the second inductor wiring 40 and the third wiring portion 51 of the third inductor wiring 50.

Note that in the main body 20, the distances W41 to W44 are not necessarily in the above-described relationship.

The first vertical wiring 61, the second vertical wiring 62, and the third vertical wiring 63 are provided inside the main body 20. The first to third vertical wirings 61 to 63 are provided in the magnetic material layer 22 and pass through the magnetic material layer 22 laminated on the main surface 21*a* of the magnetic material layer 21.

The first to third vertical wirings 61 to 63 pass through the inside of the main body 20 from each of the first to third inductor wirings 30, 40, and 50 to the surface of the main body 20 in a direction perpendicular to the virtual plane S1. Note that "passing through the inside of the main body 20" means that the first to third vertical wirings 61, 62, and 63 are not exposed from the main body 20 except for the end surfaces of the main body 20 in a direction in which the first to third vertical wirings 61, 62, and 63 extend (a direction perpendicular to the virtual plane S1), and specifically, means that peripheral surfaces of the first to third vertical wirings 61, 62, and 63 are not exposed from the main body 20.

Figure 2C:
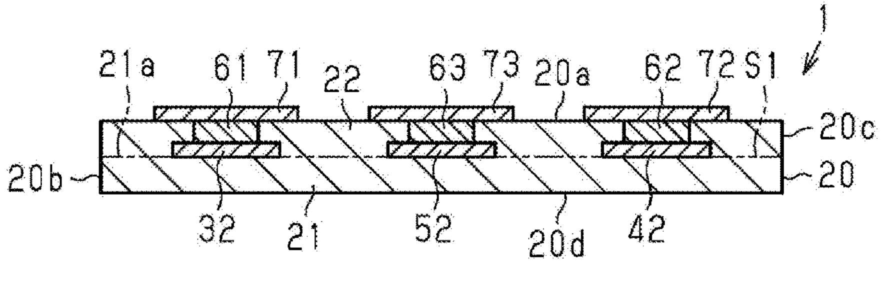
FIG. 2C is a cross-sectional view of the inductor component (a cross-sectional view taken along a line 2*c*-2*c* in FIG. 2A)

The first vertical wiring 61 extends in a direction perpendicular to the virtual plane S1 from an upper surface (upper surface in FIG. 2C) of the first connection portion 32 of the first inductor wiring 30, and passes through an inside of the magnetic material layer 22 in a direction perpendicular to the virtual plane S1. An upper end surface of the first vertical wiring 61 is exposed to the outside of the main body 20 from the upper surface 20*a* of the main body 20. Further, the first vertical wiring 61 is electrically connected to the first connection portion 32. The second vertical wiring 62 extends in a direction perpendicular to the virtual plane S1 from an upper surface (upper surface in FIG. 2C) of the second connection portion 42 of the second inductor wiring 40, and passes through the inside of the magnetic material layer 22 in a direction perpendicular to the virtual plane S1. An upper end surface of the second vertical wiring 62 is exposed to the outside of the main body 20 from the upper surface 20*a* of the main body 20. Further, the second vertical wiring 62 is electrically connected to the second connection portion 42. The third vertical wiring 63 extends in a direction perpendicular to the virtual plane S1 from an upper surface (upper surface in FIG. 2C) of the third connection portion 52 of the third inductor wiring 50, and passes through the inside of the magnetic material layer 22 in a direction perpendicular to the virtual plane S1. An upper end surface of the third vertical wiring 63 is exposed to the outside of the main body 20 from the upper surface 20*a* of the main body 20. Further, the third vertical wiring 63 is electrically connected to the third connection portion 52.

In the present embodiment, cross-sectional areas of the first vertical wiring 61, the second vertical wiring 62, and the third vertical wiring 63 are equal to each other. Note that the cross-sectional area of the vertical wiring is defined by an area of a cross-section orthogonal to a direction in which a current flows. Accordingly, in the present embodiment, the current flows through the first to third vertical wirings 61 to 63 in the direction perpendicular to the virtual plane S1, and therefore the cross-sectional areas of the first to third vertical wirings 61 to 63 in the direction parallel to the virtual plane S1 are equal to each other. In addition, lengths of the first to third vertical wirings 61 to 63 in the direction perpendicular to the virtual plane S1 are equal to each other.

For the first to third inductor wirings 30, 40, and 50 and the first to third vertical wirings 61 to 63, a good conductor, for example, silver (Ag), palladium (Pd), copper (Cu), nickel (Ni), gold (Au), aluminum (Al), an alloy containing these metals, and the like, can be used.

First to third external terminals 71 to 73 cover end surfaces of the first to third vertical wirings 61 to 63 exposed to the outside from the upper surface 20*a* of the main body 20. The first external terminal 71 is provided on the upper surface 20*a* of the main body 20, and covers the upper end surface of the first vertical wiring 61 exposed from the upper surface 20*a*. The second external terminal 72 is provided on the upper surface 20*a* of the main body 20, and covers the upper end surface of the second vertical wiring 62 exposed from the upper surface 20*a*. The third external terminal 73 is provided on the upper surface 20*a* of the main body 20, and covers the upper end surface of the third vertical wiring 63 exposed from the upper surface 20*a*.

The inductor component 1 of the present embodiment is a bottom electrode type inductor component in which the first to third external terminals 71 to 73 connected to the first to third vertical wirings 61 to 63 are exposed only to the upper surface 20*a* of the main body 20 (corresponding to the upper surface of the inductor component 1 in the present embodiment). The inductor component 1 is mounted on a circuit board by the first to third external terminals 71 to 73 being connected to the circuit board by solder in a state in which the upper surface 20*a* is made to face the circuit board.

As the material of the first to third external terminals 71 to 73, it is possible to use a material having high solder resistance and wettability. For example, a metal such as Ni, Cu, tin (Sn), or Au, an alloy containing these metals, or the like can be used. Also, the first to third external terminals 71 to 73 can be formed of a plurality of layers. For example, it is also possible to use a configuration in which Cu plating, Ni plating, and Sn plating are laminated in this order. Note that the first to third external terminals 71 to 73 may be omitted. In this case, the end surfaces of the first to third vertical wirings 61 to 63 exposed to the outside of the main body 20 may be used as a replacement for the first to third external terminals 71 to 73. This is suitable for a case where the inductor component 1 is used as a substrate embedded type to be embedded in a circuit board, instead of being used as a surface mount type.

Note that in the inductor component 1 of the present embodiment, an insulating coating film may be provided on the upper surface 20*a* and a lower surface 20*d* of the main body 20. The coating film secures an insulating property on an outer surface of the main body 20, exposes the end surfaces of the first to third vertical wirings 61 to 63, and also exposes the first to third external terminals 71 to 73 to the outside. Further, the coating film may have a role to define a range for forming the first to third external terminals 71 to 73.

Next, an overview of a method for manufacturing the above-described inductor component 1 will be described.

First, a mother multilayer body is formed. The mother multilayer body is an unbaked body in a state in which a plurality of main bodies 20 is connected in a matrix form. Specifically, first, a plurality of green sheets obtained by applying a paste in which ferrite powder is dispersed in a resin onto a film of, for example, polyethylene terephthalate (PET) by a doctor blade method and then forming a sheet is prepared.

Next, for one of the above-described green sheets, on the main surface, a conductive paste containing a conductive material is applied by screen printing to a portion where the first to third inductor wirings 30, 40, and 50 are to be formed. Note that the conductive material is a conductive material used for the above-described first to third inductor wirings 30, 40, and 50 and the first to third vertical wirings 61 to 63.

Next, for another green sheet, a through-hole is formed by a laser or the like in a portion where the above-described first to third vertical wirings 61 to 63 are to be formed, and a conductive paste is applied so as to fill the through-hole with the conductive paste. A plurality of green sheets including these two green sheets is laminated by predetermined numbers of sheets, and then is pressure-bonded, whereby a mother multilayer body is formed.

Next, the mother multilayer body is cut by dicing, guillotine, or the like, and is singulated into an unbaked body to be the main body 20. Further, by firing the singulated unbaked body in a firing furnace or the like, the main body 20 having the first to third inductor wirings 30, 40, and 50 and the first to third vertical wirings 61 to 63 therein is formed. Note that, in a case where the insulating coating film is formed on the upper surface 20*a* and the lower surface 20*d* of the main body 20, for example, a resin material is applied to the main body 20. Incidentally, in a case where the coating film is made of a baked material such as glass or alumina, before performing singulation, the sheet-shaped insulating paste containing glass powder and alumina powder may be laminated on the upper and lower surfaces of the mother multilayer body, and then pressure-bonded.

Next, the first to third external terminals 71 to 73 are formed on the upper surface 20*a* of the main body 20 by a method such as plating, sputtering, vapor deposition, coating, or the like, so that the inductor component 1 is completed. Note that the above-described manufacturing method is merely an example, and the present disclosure is not limited thereto. For example, instead of the sheet lamination method described above, a printing lamination method may be used, or the conductive material used for the first to third inductor wirings 30, 40, and 50 and the first to third vertical wirings 61 to 63 may be formed or patterned by plating, sputtering, or the like, instead of applying the conductive paste.

The operation and effect of the present embodiment will be described.

1-1. The inductor component 1 includes the main body 20, the first inductor wiring 30 located inside the main body 20 and extending on the virtual plane S1, and the second inductor wiring 40 located inside the main body 20 and extending in parallel to the virtual plane S1. Further, the inductor component 1 includes the third inductor wiring 50 located between the first inductor wiring 30 and the second inductor wiring 40 inside the main body 20 and extending in parallel to the virtual plane S1. Additionally, the inductor component 1 includes the first to third vertical wirings 61 to 63 passing through the inside of the main body 20 from each of the first to third inductor wirings 30, 40, and 50 to the surface of the main body 20 in the direction perpendicular to the virtual plane S1. Then, the third inductor wiring 50 is the low-resistance inductor wiring 55 having a DC electrical resistance smaller than those of the first inductor wiring 30 and the second inductor wiring 40.

According to the above configuration, even when a current flows through each of the first to third inductor wirings 30, 40, and 50 in the same manner, the third inductor wiring 50, in which heat particularly tends to be accumulated, is hard to generate heat as compared with the first and second inductor wirings 30 and 40. Therefore, it is possible to suppress the temperature becoming locally higher in the vicinity of the third inductor wiring 50 than in the vicinity of the first and second inductor wirings 30 and 40, and as a result, it is possible to suppress a decrease in reliability due to heat.

In the present embodiment, the first and second inductor wirings 30 and 40 located at both ends in the arrangement direction F1 are adjacent to the third inductor wiring 50 only on one side in the arrangement direction F1. Then, the third inductor wiring 50 located between the first and second inductor wirings 30 and 40 at both ends has a smaller DC electrical resistance than those of the first and second inductor wirings 30 and 40. Therefore, even when the inductor wiring (the first and second inductor wirings 30 and 40 in the present embodiment) adjacent to both sides of the third inductor wiring 50 that is the low-resistance inductor wiring 55 is present, the heat generation of the third inductor wiring 50 is suppressed, so that the heat being accumulated in the surrounding of the third inductor wiring 50 is suppressed, and the temperature rise of the third inductor wiring 50 is suppressed.

Further, a difference in temperature becoming large between the first and second inductor wirings 30 and 40 and the third inductor wiring 50 is suppressed, that is, the temperature of the third inductor wiring 50 becoming high is suppressed as compared with the first and second inductor wirings 30 and 40. Therefore, occurrence of electrochemical migration can be suppressed in a connection portion between the third vertical wiring 63 connected to the third inductor wiring 50 and the circuit board on which the inductor component 1 is mounted.

From these reasons, it is possible to suppress a decrease in reliability due to heat in the bottom electrode type inductor component 1 having the aligned first to third inductor wirings 30, 40, and 50.

1-2. At least a part of the low-resistance inductor wiring 55 has a cross-sectional area larger than those of the first inductor wiring 30 and the second inductor wiring 40. By doing so, it is possible to easily make the DC electrical resistance of the low-resistance inductor wiring 55 smaller than the DC electrical resistances of the first and second inductor wirings 30 and 40.

1-3. At least a part of the low-resistance inductor wiring 55 has a wiring width larger than those of the first inductor wiring 30 and the second inductor wiring 40. By doing so, it is possible to more easily make the DC electrical resistance of the low-resistance inductor wiring 55 smaller than the DC electrical resistance of the first and second inductor wirings 30 and 40, as compared with a case where the cross-sectional area of the low-resistance inductor wiring 55 is increased by increasing the wiring thickness of the low-resistance inductor wiring 55.

1-4. The first inductor wiring 30 includes the first wiring portion 31 and the first connection portion 32 provided at both ends of the first wiring portion 31 and connected to the first vertical wiring 61. The second inductor wiring 40 includes the second wiring portion 41 and the second connection portion 42 provided at both ends of the second wiring portion 41 and connected to the second vertical wiring 62. The third inductor wiring 50 that is the low-resistance inductor wiring 55 includes the third wiring portion 51 that is a low-resistance wiring portion, and the third connection portion 52 that is a low-resistance connection portion provided at both ends of the third wiring portion 51 and connected to the third vertical wiring 63. Among the end surfaces of the main body 20 in the arrangement direction F1 of the first to third inductor wirings 30, 40 and 50, an end surface on the first inductor wiring 30 side is referred to as the first end surface 20*b*, and an end surface on the second inductor wiring 40 side is referred to as the second end surface 20*c*. At this time, the distance W41 between the first end surface 20*b* and the first wiring portion 31 is shorter than the distance W42 between the third wiring portion 51 of the low-resistance inductor wiring 55 adjacent to the first inductor wiring 30 and the first wiring portion 31. The distance W43 between the second end surface 20*c* and the second wiring portion 41 is shorter than the distance W44 between the third wiring portion 51 of the low-resistance inductor wiring 55 adjacent to the second inductor wiring 40 and the second wiring portion 41.

Here, a case is considered where a third inductor wiring having a third wiring portion having a wiring width equal to those of the first and second wiring portions 31 and 41 is located between the first inductor wiring 30 and the second inductor wiring 40. It is assumed that the first inductor wiring 30, the second inductor wiring 40, and the third inductor wiring are arranged at equal intervals in the arrangement direction F1. In the inductor formed of the third inductor wiring, on both sides in the arrangement direction F1 of the third inductor wiring, a portion between the first wiring portion 31 and the third wiring portion in the main body 20 and a portion between the second wiring portion 41 and the third wiring portion in the main body 20 serve as a magnetic path. On the other hand, in the inductor formed of the first inductor wiring 30, on one side in the arrangement direction F1, a portion between the first end surface 20*b* and the first wiring portion 31 in the main body 20 serves as a magnetic path. Further, in the inductor formed of the first inductor wiring 30, on the other side in the arrangement direction F1, a portion of the main body 20 between the third wiring portion of the third inductor wiring adjacent to the first inductor wiring 30 and the first wiring portion 31 serves as a magnetic path. The distance W41 between the first end surface 20*b* and the first wiring portion 31 is shorter than a distance between the third wiring portion of the third inductor wiring adjacent to the first inductor wiring 30 and the first wiring portion 31. Therefore, inductance of the inductor formed of the first inductor wiring 30 is lower than inductance of that of the inductor formed of the third inductor wiring. Similarly, in the inductor formed of the second inductor wiring 40, on the one side in the arrangement direction F1, a portion of the main body 20 between the third wiring portion of the third inductor wiring adjacent to the second inductor wiring 40 and the second wiring portion 41 serves as a magnetic path. Further, in the inductor formed of the second inductor wiring 40, on the other side in the arrangement direction F1, a portion between the second end surface 20*c* and the second wiring portion 41 in the main body 20 serves as a magnetic path. The distance W43 between the second end surface 20*c* and the second wiring portion 41 is shorter than a distance between the third wiring portion of the third inductor wiring adjacent to the second inductor wiring 40 and the second wiring portion 41. Therefore, inductance of the inductor formed of the second inductor wiring 40 is lower than inductance of the inductor formed of the third inductor wiring. As described above, the inductance varies in the three inductors formed of the first inductor wiring 30, the second inductor wiring 40, and the third inductor wiring.

In the present embodiment, by making the wiring width W31 of the third wiring portion 51 of the third inductor wiring 50 larger, the distances W42 and W44 become shorter in the main body 20 by the corresponding amount, and therefore, inductance of the inductor formed by the third inductor wiring 50 is reduced. As a result, even when the distance W41 between the first end surface 20*b* and the first wiring portion 31 is shorter than the distance W42 between the third wiring portion 51 and the first wiring portion 31, it is possible to reduce the variation in inductance between the inductor formed of the first inductor wiring 30 and the inductor formed of the third inductor wiring 50. Similarly, even when the distance W43 between the second end surface 20*c* and the second wiring portion 41 is shorter than the distance W44 between the third wiring portion 51 and the second wiring portion 41, it is possible to reduce the variation in inductance between the inductor formed of the second inductor wiring 40 and the inductor formed of the third inductor wiring 50.

1-5. The main body 20 is a sintered body. Since the main body 20, i.e., the magnetic material layers 21 and 22 configuring the main body 20, are a sintered body, it is possible to form the inductor wirings 30, 40, and 50 with high quality and at a low cost.

Second Embodiment

Hereinafter, a second embodiment of an inductor component will be described.

Note that in the present embodiment, the same constituent members as those in the above-described embodiment or constituent members corresponding to those in the above-described embodiment are denoted by the same reference numerals, and some or all of the description may be omitted in some cases.

Figure 3A:
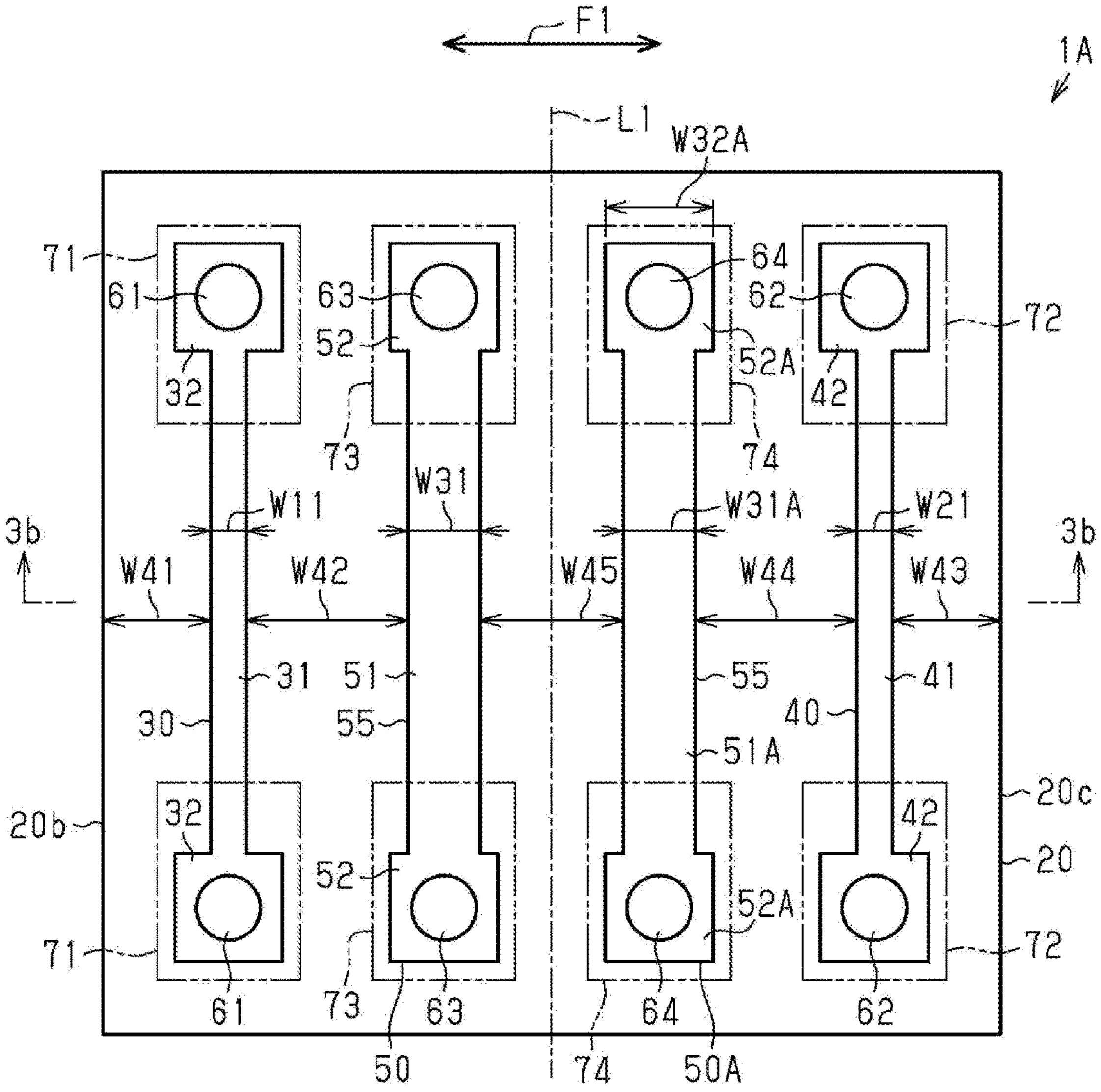
FIG. 3A is a perspective plan view of an inductor component according to a second embodiment.
Figure 3B:
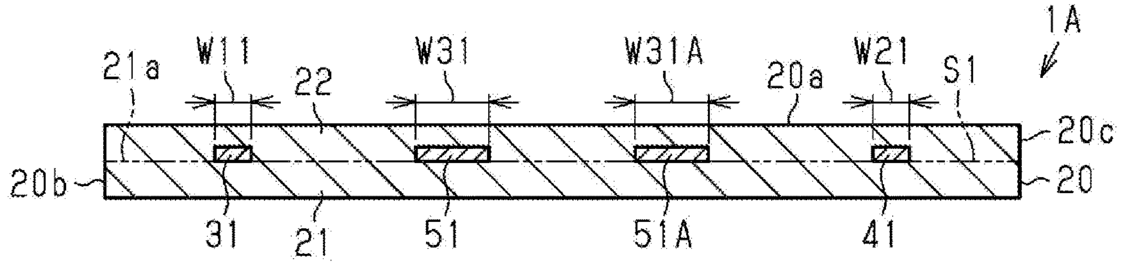
FIG. 3B is a cross-sectional view of the inductor component (a cross-sectional view taken along a line 3*b*-3*b* in FIG. 3A)

An inductor component 1A illustrated in FIG. 3A and FIG. 3B is configured to further include a fourth inductor wiring 50A that is located between the second inductor wiring 40 and the third inductor wiring 50 inside the main body 20 and extends in parallel to the virtual plane S1 in the inductor component 1 of the above-described first embodiment. The fourth inductor wiring 50A is the low-resistance inductor wiring 55. That is, the inductor component 1A of the present embodiment differs from the inductor component 1 of the above-described first embodiment in the number of the low-resistance inductor wirings 55. The inductor component 1A includes two low-resistance inductor wirings 55 between the first inductor wiring 30 and the second inductor wiring 40.

The fourth inductor wiring 50A located between the second inductor wiring 40 and the third inductor wiring 50 extends in parallel to the main surface 21*a* on the main surface 21*a* of the magnetic material layer 21, similarly to the first to third inductor wirings 30, 40, and 50. For this reason, the first to fourth inductor wirings 30, 40, 50, and 50A are located on the same virtual plane S1. Further, the first to fourth inductor wirings 30, 40, 50, and 50A are aligned at equal intervals along one direction parallel to the virtual plane S1.

The fourth inductor wiring 50A is the low-resistance inductor wiring 55 having a DC electrical resistance smaller than those of the first inductor wiring 30 and the second inductor wiring 40. The fourth inductor wiring 50A includes a fourth wiring portion 51A and a fourth connection portion 52A provided at both ends of the fourth wiring portion 51A. Since the fourth inductor wiring 50A is the low-resistance inductor wiring 55, the fourth wiring portion 51A corresponds to an example of a low-resistance wiring portion, and the fourth connection portion 52A corresponds to an example of a low-resistance connection portion.

The fourth wiring portion 51A has a substantially belt-like shape extending linearly along a direction orthogonal to the arrangement direction F1 and parallel to the virtual plane S1. The fourth wiring portion 51A extends in parallel to the first wiring portion 31 and the second wiring portion 41. The fourth wiring portion 51A is formed to have a constant wiring width W31A and a constant thickness. Also, the fourth wiring portion 51A has a line length and a thickness equal to those of the first wiring portion 31 and the second wiring portion 41. The fourth wiring portion 51A of the present embodiment has the same shape as that of the third wiring portion 51. That is, the wiring width W31A of the fourth wiring portion 51A is equal to the wiring width W31 of the third wiring portion 51. Further, the fourth wiring portion 51A has a line length and a thickness equal to those of the third wiring portion 51. The fourth wiring portion 51A has a substantially belt-like shape (i.e., a state illustrated in FIG. 3A) viewed from a direction perpendicular to the virtual plane S1, the shape being the same as that of the third wiring portion 51.

The fourth connection portion 52A is formed integrally with the fourth wiring portion 51A. In the present embodiment, each fourth connection portion 52A has a substantially quadrangular shape of a substantially square shape (i.e., a state illustrated in FIG. 3A) viewed from a direction perpendicular to the virtual plane S1, the shape being the same as those of the first to third connection portions 32, 42, and 52. The fourth connection portion 52A has the same size as those of the first to third connection portions 32, 42, and 52, and has a thickness equal to those of the first to third connection portions 32, 42, and 52. Further, a wiring width W32A of the fourth connection portion 52A (a width in the same direction as a wiring width direction of the fourth wiring portion 51A) is larger than the wiring width W31A of the fourth wiring portion 51A. That is, a boundary between the fourth wiring portion 51A and the fourth connection portion 52A is a place where the wiring width changes. Further, a center position in a wiring width direction of the fourth connection portion 52A in the arrangement direction F1 coincides with a center position in the wiring width direction of the fourth wiring portion 51A in the arrangement direction F1. That is, the fourth wiring portion 51A extends from a central portion in the wiring width direction of one fourth connection portion 52A to a central portion in the wiring width direction of another fourth connection portion 52A.

At least a part of the fourth inductor wiring 50A that is the low-resistance inductor wiring 55 has a cross-sectional area larger than those of the first inductor wiring 30 and the second inductor wiring 40. In the present embodiment, at least a part of the fourth inductor wiring 50A is formed to have a cross-sectional area larger than those of the first inductor wiring 30 and the second inductor wiring 40 because of having the wiring width larger than those of the first inductor wiring 30 and the second inductor wiring 40. Specifically, the fourth wiring portion 51A has a wiring width larger than those of the first wiring portion 31 and the second wiring portion 41. Therefore, a cross-sectional area of the fourth wiring portion 51A (an area of a cross-section perpendicular to a direction in which a current flows) is larger than the cross-sectional area of the first wiring portion 31 and the cross-sectional area of the second wiring portion 41. As described above, since the wiring width W31 of the fourth wiring portion 51A is larger than the wiring widths W11 and W21 of the first and second wiring portions 31 and 41, that is, the cross-sectional area of the fourth wiring portion 51A is larger than the cross-sectional areas of the first and second wiring portions 31 and 41, the fourth inductor wiring 50A has a DC electrical resistance smaller than those of the first and second inductor wirings 30 and 40. Note that the wiring width W31A of the fourth wiring portion 51A may be different from the wiring width W31 of the third wiring portion 51 as long as the wiring width W31A is larger than the wiring width W11 of the first wiring portion 31 and the wiring width W21 of the second wiring portion 41.

In the inductor component 1A, the low-resistance inductor wiring 55 closer to an intermediate position between the first inductor wiring 30 and the second inductor wiring 40 has a smaller DC electrical resistance. In the present embodiment, it is set that the third and fourth inductor wirings 50 and 50A closer to the intermediate position between the first inductor wiring 30 and the second inductor wiring 40 have a larger cross-sectional area of the low-resistance wiring portion, i.e., the third and fourth wiring portions 51 and MA. Accordingly, it is set that the low-resistance inductor wiring 55 closer to the intermediate position between the first inductor wiring 30 and the second inductor wiring 40 has a smaller DC electrical resistance. FIG. 3A illustrates a center line L1 passing through the intermediate position between the first inductor wiring 30 and the second inductor wiring 40 and extending in parallel to the virtual plane S1 by a dashed-dotted line. Since the third inductor wiring 50 and the fourth inductor wiring 50A have the same distance from the center line L1 in the arrangement direction F1, the wiring width W31 and the thickness of the third wiring portion 51 and the wiring width W31A and the thickness of the fourth wiring portion 51A are made equal to each other. That is, the cross-sectional areas of the third wiring portion 51 and the fourth wiring portion 51A are equal to each other.

The one first to fourth connection portions 32, 42, 52, and 52A (upper connection portion in FIG. 3A) of the first to fourth inductor wirings 30, 40, 50, and 50A have equal positions in a direction perpendicular to the arrangement direction F1 and parallel to the virtual plane S1. Therefore, the first to fourth connection portions 32, 42, 52, and 52A of the first to fourth inductor wirings 30, 40, 50, and 50A are aligned along the arrangement direction F1. Further, the first to fourth connection portions 32, 42, 52, and 52A are arranged at equal intervals along the arrangement direction F1. Similarly, the other first to fourth connection portions 32, 42, 52, and 52A (lower connection portions in FIG. 3A) of the first to fourth inductor wirings 30, 40, 50, and 50A have equal positions in a direction perpendicular to the arrangement direction F1 and parallel to the virtual plane S1. Therefore, the other first to fourth connection portions 32, 42, 52, and 52A of the first to fourth inductor wirings 30, 40, 50, and 50A are aligned along the arrangement direction F1. Further, the first to fourth connection portions 32, 42, 52, and 52A are arranged at equal intervals along the arrangement direction F1.

The distance W41 between the first wiring portion 31 and the first end surface 20*b* is shorter than the distance W42 between the third wiring portion 51 of the third inductor wiring 50 (low-resistance inductor wiring 55) adjacent to the first inductor wiring 30 and the first wiring portion 31. Further, the distance W43 between the second wiring portion 41 and the second end surface 20*c* is shorter than the distance W44 between the fourth wiring portion 51A of the fourth inductor wiring 50A (low-resistance inductor wiring 55) adjacent to the second inductor wiring 40 and the second wiring portion 41. In addition, in the present embodiment, the distance W42 between the first wiring portion 31 and the third wiring portion 51 is equal to the distance W44 between the second wiring portion 41 and the fourth wiring portion 51A.

Further, the distance W45 between the third wiring portion 51 and the fourth wiring portion 51A is shorter than the distance W42 between the first wiring portion 31 and the third wiring portion 51 and the distance W44 between the second wiring portion 41 and the fourth wiring portion 51A. More specifically, the distance W45 between the third wiring portion 51 and the fourth wiring portion 51A is shorter than the distance W42 and the distance W44 by half of a difference between the wiring width W31 of the third wiring portion 51 or the wiring width W31A of the fourth wiring portion 51A and the wiring width W11 of the first wiring portion 31 or the wiring width W21 of the second wiring portion 41. Note that in the main body 20, the distances W41 to W45 are not necessarily in the above-described relationship.

A fourth vertical wiring 64 is connected to the fourth connection portion 52A of the fourth inductor wiring 50A. The fourth vertical wiring 64 is provided inside the main body 20. The fourth vertical wiring 64 passes through the inside of the main body 20 from the fourth inductor wiring 50A to the surface of the main body 20 in a direction perpendicular to the virtual plane S1. Specifically, the fourth vertical wiring 64 extends from an upper surface of the fourth connection portion 52A in the direction perpendicular to the virtual plane S1, and passes through the inside of the magnetic material layer 22 in the direction perpendicular to the virtual plane S1. An upper end surface of the fourth vertical wiring 64 is exposed to the outside of the main body 20 from the upper surface 20*a* of the main body 20. Further, the fourth vertical wiring 64 is electrically connected to the fourth connection portion 52A.

Each upper end surface of the fourth vertical wiring 64 exposed to the outside from the upper surface 20*a* of the main body 20 is covered with a fourth external terminal 74. The inductor component 1A of the present embodiment is a bottom electrode type inductor component in which the first to fourth external terminals 71 to 74 connected to the first to fourth vertical wirings 61 to 64 are exposed only to the upper surface 20*a* of the main body 20 (corresponding to the upper surface of the inductor component 1A in the present embodiment).

In the present embodiment, the fourth inductor wiring 50A is made of the same material as the third inductor wiring 50, and the fourth vertical wiring 64 is made of the same material as that of the third vertical wiring 63. In addition, the fourth external terminal 74 is made of the same material as that of the third external terminal 73.

The inductor component 1A of the present embodiment is manufactured by the same method as that of the inductor component 1 of the first embodiment described above.

The operation of the present embodiment will be described.

In the inductor component 1A, changes in inductance of the inductor formed of each of the first to fourth inductor wirings 30, 40, 50, and 50A was simulated, in a case where the wiring width W31 of the third wiring portion 51 of the third inductor wiring 50 and the wiring width W31A of the fourth wiring portion 51A of the fourth inductor wiring 50A were changed. A material of the first to fourth inductor wirings 30, 40, 50, and 50A was Cu, and an interval in the arrangement direction F1 of the first to fourth inductor wirings 30, 40, 50, and 50A (an interval of the center in the wiring width direction) was set to about 300 μm interval. In addition, the thicknesses of the first to fourth inductor wirings 30, 40, 50, and 50A were set to about 50 μm. Further, the wiring width W11 of the first wiring portion 31 of the first inductor wiring 30 and the wiring width W21 of the second wiring portion 41 of the second inductor wiring 40 were set to about 50 μm. As a result of the simulation, it has been found that when each of the wiring width W31 and the wiring width W31A is made about 6.4% thicker than the wiring width W11, each of the inductance of the inductor formed of the third inductor wiring 50 and the inductance of the inductor formed of the fourth inductor wiring 50A becomes equal to the inductance of the inductor formed of the first inductor wiring 30. Further, it has been found that when each of the wiring width W31 and the wiring width W31A is made about 6.4% thicker than the wiring width W21, each of the inductance of the inductor formed of the third inductor wiring 50 and the inductance of the inductor formed of the fourth inductor wiring 50A becomes equal to the inductance of the inductor formed of the second inductor wiring 40.

According to the present embodiment, the following effects are obtained in addition to the effects similar to those of the above-described first embodiment.

2-1. The inductor component 1A further includes the fourth inductor wiring 50A that is located between the second inductor wiring 40 and the third inductor wiring 50 inside the main body 20 and extends in parallel to the virtual plane S1. The fourth inductor wiring 50A is the low-resistance inductor wiring 55.

In general, in a case of an inductor component including a plurality of inductor wirings having the same wiring width and line length and having the same DC electrical resistance, when a current is made to flow in the same manner through each inductor wiring of the plurality of inductor wirings aligned on the same virtual plane, the temperature of the inductor wiring closer to an intermediate position of the inductor wirings at both ends tends to be higher. Therefore, in the present embodiment, the third inductor wiring 50 and the fourth inductor wiring 50A that are located between the first inductor wiring 30 and the second inductor wiring 40 are referred to as the low-resistance inductor wiring 55 that has the DC electrical resistance smaller than those of the first inductor wiring 30 and the second inductor wiring 40. Therefore, even in a case where the current flows through each of the first to fourth inductor wirings 30, 40, 50, and 50A in the same manner, the third and fourth inductor wirings 50 and 50A, in which heat particularly tends to be accumulated, are hard to generate heat as compared with the first and second inductor wirings 30 and 40. Therefore, the temperature becoming locally high is suppressed in the vicinity of the third and fourth inductor wirings 50 and 50A as compared with in the vicinity of the first and second inductor wirings 30 and 40.

Further, a difference in temperature becoming large between the first and second inductor wirings 30 and 40 and the third and fourth inductor wirings 50 and 50A is suppressed, that is, the temperature of the third and fourth inductor wirings 50 and 50A becoming high is suppressed as compared with the first and second inductor wirings 30 and 40. Therefore, it is possible to suppress the occurrence of the electrochemical migration not only at the connection portion between the third vertical wiring 63 connected to the third inductor wiring 50 and the circuit board on which the inductor component 1A is mounted, but also at a connection portion between the fourth vertical wiring 64 connected to the fourth inductor wiring 50A and the circuit board on which the inductor component 1A is mounted.

From these reasons, it is possible to suppress a decrease in reliability due to heat in the bottom electrode type inductor component 1A having the aligned first to fourth inductor wirings 30, 40, 50, and 50A.

2-2. The first inductor wiring 30 includes the first wiring portion 31 and the first connection portion 32 provided at both ends of the first wiring portion 31 and connected to the first vertical wiring 61. The second inductor wiring 40 includes the second wiring portion 41 and the second connection portion 42 provided at both ends of the second wiring portion 41 and connected to the second vertical wiring 62. The third inductor wiring 50, which is the low-resistance inductor wiring 55 located between the first inductor wiring 30 and the second inductor wiring 40, includes the third wiring portion 51 and the third connection portion 52 provided at both ends of the third wiring portion 51 and connected to the third vertical wiring 63. The fourth inductor wiring 50A, which is the low-resistance inductor wiring 55 located between the first inductor wiring 30 and the second inductor wiring 40, includes the fourth wiring portion 51A and the fourth connection portion 52A provided at both ends of the fourth wiring portion 51A and connected to the fourth vertical wiring 64. Then, the low-resistance inductor wiring 55 closer to the intermediate position between the first inductor wiring 30 and the second inductor wiring 40 has larger cross-sectional areas of the third and fourth wiring portions 51 and 51A.

According to this configuration, increasing the cross-sectional areas of the third and fourth wiring portions 51 and 51A in the low-resistance inductor wiring 55 closer to the intermediate position between the first inductor wiring 30 and the second inductor wiring 40 makes it possible to have a configuration in which the DC electrical resistance is smaller in the low-resistance inductor wiring 55 closer to the intermediate position between the first inductor wiring 30 and the second inductor wiring 40. In general, in a case of an inductor component including a plurality of inductor wirings having the same wiring width and line length and having the same DC electrical resistance, when a current is made to flow in the same manner through each inductor wiring of the plurality of inductor wirings aligned on the same virtual plane, the temperature of the inductor wiring closer to the intermediate position of the inductor wirings at both ends tends to be higher. Therefore, by doing so, it is possible to easily suppress the temperature locally becoming high in the vicinity of the intermediate position between the first inductor wiring 30 and the second inductor wiring 40. As a result, it is possible to easily suppress a decrease in reliability due to heat.

Modification

The above-described embodiments may be modified as follows. The above-described embodiments and the following modifications may be implemented in combination with each other within a scope that does not contradict the technical scope of the present disclosure. Note that in each modification, the same constituent members as those in the above-described embodiments or constituent members corresponding to those in the above-described embodiments are denoted by the same reference numerals, and some or all of the description may be omitted in some cases.

In the above-described second embodiment, in the third inductor wiring 50 that is the low-resistance inductor wiring 55, the center position in the wiring width direction of the third wiring portion 51 in the arrangement direction F1 coincides with the center position in the wiring width direction of the third connection portion 52 in the arrangement direction F1. Further, in the fourth inductor wiring 50A that is the low-resistance inductor wiring 55, the center position in the wiring width direction of the fourth wiring portion 51A in the arrangement direction F1 coincides with the center position in the wiring width direction of the fourth connection portion 52A in the arrangement direction F1. However, in the third inductor wiring 50, the center position in the wiring width direction of the third wiring portion 51 in the arrangement direction F1 does not necessarily coincide with the center position in the wiring width direction of the third connection portion 52 in the arrangement direction F1. Similarly, in the fourth inductor wiring 50A, the center position in the wiring width direction of the fourth wiring portion 51A in the arrangement direction F1 does not necessarily coincide with the center position in the wiring width direction of the fourth connection portion 52A in the arrangement direction F1.

Figure 4A:
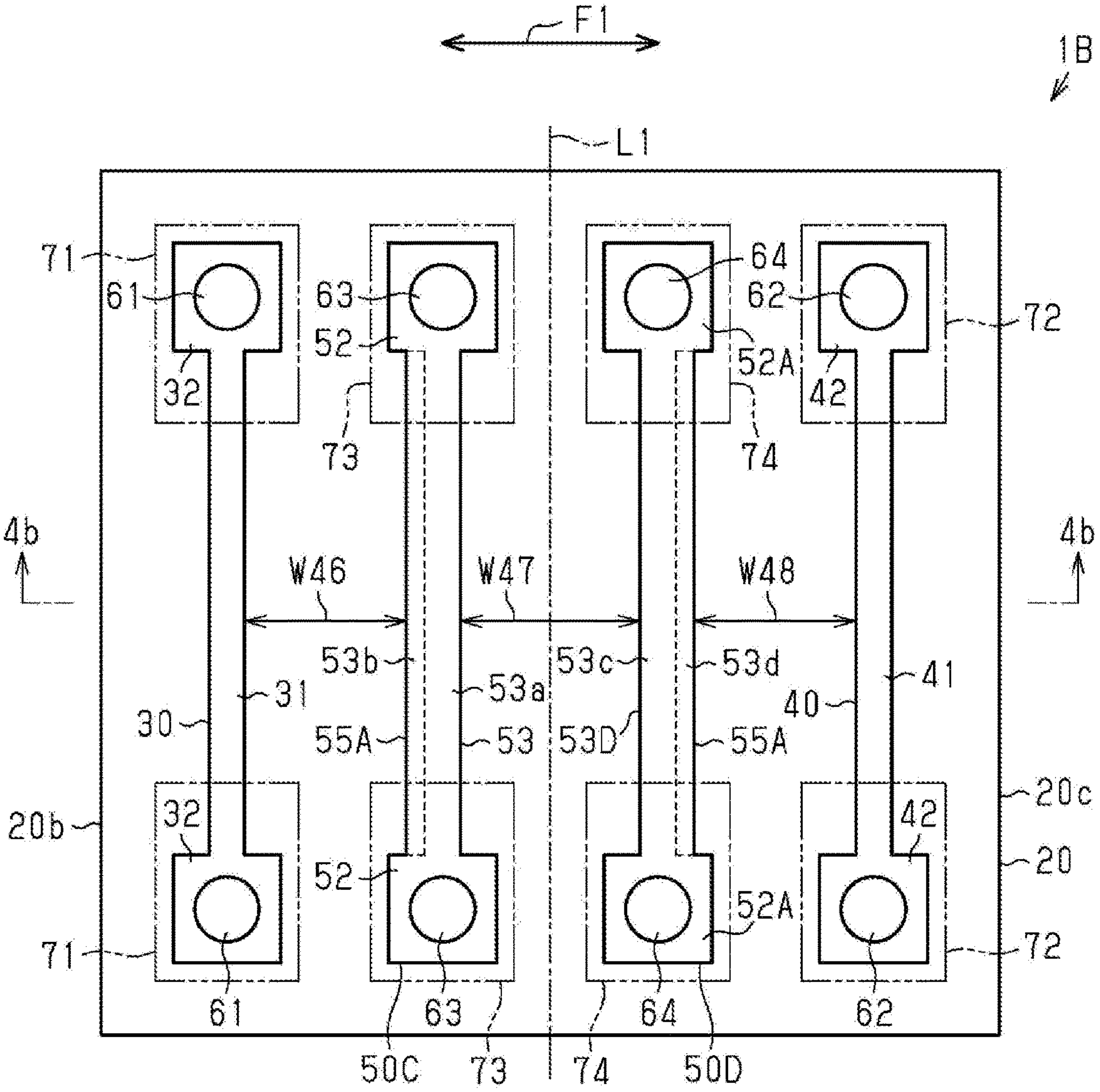
FIG. 4A is a perspective plan view of an inductor component of a modification.
Figure 4B:
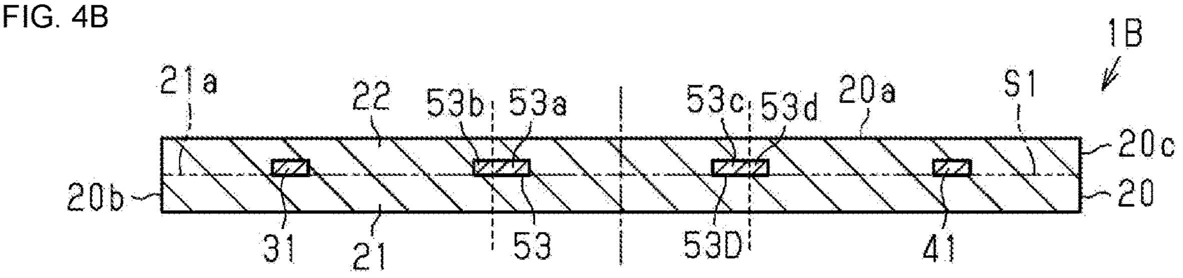
FIG. 4B is a cross-sectional view of the inductor component (a cross-sectional view taken along a line 4*b*-4*b* in FIG. 4A.

For example, an inductor component 1B illustrated in FIG. 4A and FIG. 4B includes, in the inductor component 1A of the above-described second embodiment, a third inductor wiring 50C instead of the third inductor wiring 50, and a fourth inductor wiring 50D instead of the fourth inductor wiring 50A. The third and fourth inductor wirings 50C and 50D are located on the same virtual plane S1 as the first inductor wiring 30 and the second inductor wiring 40. The first to fourth inductor wirings 30, 40, 50C and 50D are aligned at equal intervals along one direction parallel to the virtual plane S1. Further, the third inductor wiring 50C is located between the first inductor wiring 30 and the second inductor wiring 40, and the fourth inductor wiring 50D is located between the second inductor wiring 40 and the third inductor wiring 50C. The first wiring portion 31 and the second wiring portion 41 have the same wiring widths.

Each of the third and fourth inductor wirings 50C and 50D is a low-resistance inductor wiring 55A having a DC electrical resistance smaller than those of the first and second inductor wirings 30 and 40. Thickness of the third and fourth inductor wirings 50C and 50D (the thickness in the direction perpendicular to the virtual plane S1) are equal to the thicknesses of the first and second inductor wirings 30 and 40. The third inductor wiring 50C includes a third wiring portion 53 and the third connection portion 52 provided at both ends of the third wiring portion 53. The fourth inductor wiring 50D includes a fourth wiring portion 53D and the fourth connection portion 52A provided at both ends of the fourth wiring portion 53D. Each of the third wiring portion 53 and the fourth wiring portion 53D corresponds to an example of a low-resistance wiring portion, and each of the third connection portion 52 and the fourth connection portion 52A corresponds to an example of a low-resistance connection portion, respectively. The first to fourth connection portions 32, 42, 52, and 52A located on one end side of the first to fourth wiring portions 31, 41, 53, and 53D are arranged at equal intervals in the arrangement direction F1. Further, the first to fourth connection portions 32, 42, 52, and 52A located on the other end side of the first to fourth wiring portions 31, 41, 53, and 53D are arranged at equal intervals in the arrangement direction F1.

The third wiring portion 53 includes a base portion 53*a* having the same wiring width as those of the first wiring portion 31 and the second wiring portion 41, and an extension portion 53*b* provided integrally with the base portion 53*a* on one side in a wiring width direction of the base portion 53*a*. In FIG. 4A, the extension portion 53*b* is an inner side portion of a broken line illustrated in the third wiring portion 53. Note that the third wiring portion 53 has a constant wiring width, and also the base portion 53*a* and the extension portion 53*b* have a constant width. In the third inductor wiring 50C, a center position in the wiring width direction of the base portion 53*a* in the arrangement direction F1 coincides with the center position in the wiring width direction of the third connection portion 52 in the arrangement direction F1.

The fourth wiring portion 53D includes a base portion 53*c* having a wiring width equal to those of the first wiring portion 31 and the second wiring portion 41, and an extension portion 53*d* provided integrally with the base portion 53*c* on one side in a wiring width direction of the base portion 53*c*. In FIG. 4A, the extension portion 53*d* is an inner side portion of a broken line illustrated in the fourth wiring portion 53D. Note that the fourth wiring portion 53D has a constant wiring width, and also the base portion 53*c* and the expansion portion 53*d* have a constant width. In the fourth inductor wiring 50D, a center position in the wiring width direction of the base portion 53*c* in the arrangement direction F1 coincides with the center position in the wiring width direction of the fourth connection portion 52A in the arrangement direction F1. Then, the first wiring portion 31, the second wiring portion 41, and the base portions 53*a* and 53*c* are located at equal intervals in the arrangement direction F1.

In the third inductor wiring 50C, the extension portion 53*b* is located on the side, of both sides in the wiring width direction of the base portion 53*a*, farther from the center line L1 passing through the center position of the first inductor wiring 30 and the second inductor wiring 40 and parallel to the virtual plane S1. Specifically, in FIG. 4A, the center line L1 is located on the right side of the third inductor wiring 50C. In the third inductor wiring 50C, the extension portion 53*b* is located on the left side of the base portion 53*a*, that is, on the side of the first inductor wiring 30 adjacent to the third inductor wiring 50C. For this reason, the third wiring portion 53 of the third inductor wiring 50C is closer to the first wiring portion 31 side in the arrangement direction F1 than the third connection portion 52. That is, the center in the wiring width direction of the third wiring portion 53 is located closer to the first wiring portion 31 side in the arrangement direction F1 than the center in the wiring width direction of the third connection portion 52.

In the fourth inductor wiring 50D, the expansion portion 53*d* is located on the side farther from the center line L1 of both sides in the wiring width direction of the base portion 53*c*. Specifically, in FIG. 4A, the center line L1 is located on the left side of the fourth inductor wiring 50D. In the fourth inductor wiring 50D, the extension portion 53*d* is located on the right side of the base portion 53*c*, that is, on the side of the second inductor wiring 40 adjacent to the fourth inductor wiring 50D. Therefore, the fourth wiring portion 53D of the fourth inductor wiring 50D is closer to the second wiring portion 41 side in the arrangement direction F1 than the fourth connection portion 52A. That is, the center in a wiring width direction of the fourth wiring portion 53D is located closer to the second wiring portion 41 side in the arrangement direction F1 than the center in the wiring width direction of the fourth connection portion 52A.

A distance W46 between the first wiring portion 31 and the third wiring portion 53 is shorter than a distance W47 between the third wiring portion 53 and the fourth wiring portion 53D by the width of the expansion portion 53*b*. Further, a distance W48 between the second wiring portion 41 and the fourth wiring portion 53D is shorter than the distance W47 between the third wiring portion 53 and the fourth wiring portion 53D by the width of the expansion portion 53*d*. Further, the distance W46 between the first wiring portion 31 and the third wiring portion 53 is equal to the distance W48 between the second wiring portion 41 and the fourth wiring portion 53D.

According to the above configuration, the third wiring portion 53 of the third inductor wiring 50C is closer to the first wiring portion 31 side than the third connection portion 52, so that the width in the arrangement direction F1 of a portion between the first wiring portion 31 and the third wiring portion 53 in the main body 20 is narrowed. That is, the wiring width of the third wiring portion 53 is made large so as to narrow the magnetic path between the third wiring portion 53 of the third inductor wiring 50C adjacent to the first inductor wiring 30 and the first wiring portion 31. Therefore, the inductance of the inductor formed of the first inductor wiring 30 is suppressed.

Similarly, the fourth wiring portion 53D of the fourth inductor wiring 50D is closer to the second wiring portion 41 side than the fourth connection portion 52A, so that the width in the arrangement direction F1 of a portion between the second wiring portion 41 and the fourth wiring portion 53D in the main body 20 is narrowed. That is, the wiring width of the fourth wiring portion 53D is made large so as to narrow the magnetic path between the fourth wiring portion 53D of the fourth inductor wiring 50D adjacent to the second inductor wiring 40 and the second wiring portion 41. Therefore, the inductance of the inductor formed of the second inductor wiring 40 is suppressed.

In general, in a case where two inductor wirings are disposed between the first inductor wiring 30 and the second inductor wiring 40, the heat tends to be accumulated in a portion closer to the center of the first inductor wiring 30 and the second inductor wiring 40 as compared with a case where one inductor wiring disposed between the first inductor wiring 30 and the second inductor wiring 40 is provided. Therefore, even in the case where the current flows through each inductor wiring in the same manner, the portion closer to the center of the first inductor wiring 30 and the second inductor wiring 40 in the inductor component is more likely to generate heat.

Therefore, in the inductor component 1B, wiring widths of the third wiring portion 53 of the third inductor wiring 50C and the fourth wiring portion 53D of the fourth inductor wiring 50D, which are disposed between the first inductor wiring 30 and the second inductor wiring 40, are made larger than the wiring widths of the first wiring portion 31 and the second wiring portion 41. Accordingly, even when the current flows through each of the first to fourth inductor wirings 30, 40, 50C and 50D in the same manner, heat generation of the third and fourth inductor wirings 50C and 50D is suppressed. When the wiring widths of the third wiring portion 53 and the fourth wiring portion 53D are made larger than the wiring widths of the first wiring portion 31 and the second wiring portion 41, for example, it is considered to increase the wiring widths of the third wiring portion 53 and the fourth wiring portion 53D by simply providing the extension portion on both sides in the wiring width direction of each base portion of 53*a* and 53*c* in the same way. In this manner, the inductance of the inductor formed of each of the first and second inductor wirings 30 and 40 is lower than the inductance of the inductor formed of each of the third and fourth inductor wirings 50C and 50D. On the other hand, in the inductor component 1B, the wiring widths of the third wiring portion 53 and the fourth wiring portion 53D are made larger in a direction from an intermediate position between the first wiring portion 31 and the second wiring portion 41 toward an outer side portion of the inductor component 1B along the arrangement direction F1. In this manner, it is possible to reduce the inductance of the inductor formed of each of the first and second inductor wirings 30 and 40 while suppressing a decrease in inductance of the inductor formed of each of the third and fourth inductor wirings 50C and 50D. Therefore, the inductor component 1B as a whole can be adjusted in a direction in which the inductance of the inductor formed of each of the first to fourth inductor wirings 30, 40, 50C, and 50D is aligned.

Note that the third wiring portion 53 of the third inductor wiring 50C does not necessarily have to be closer to the first wiring portion 31 side than the third connection portion 52.

Figure 5A:
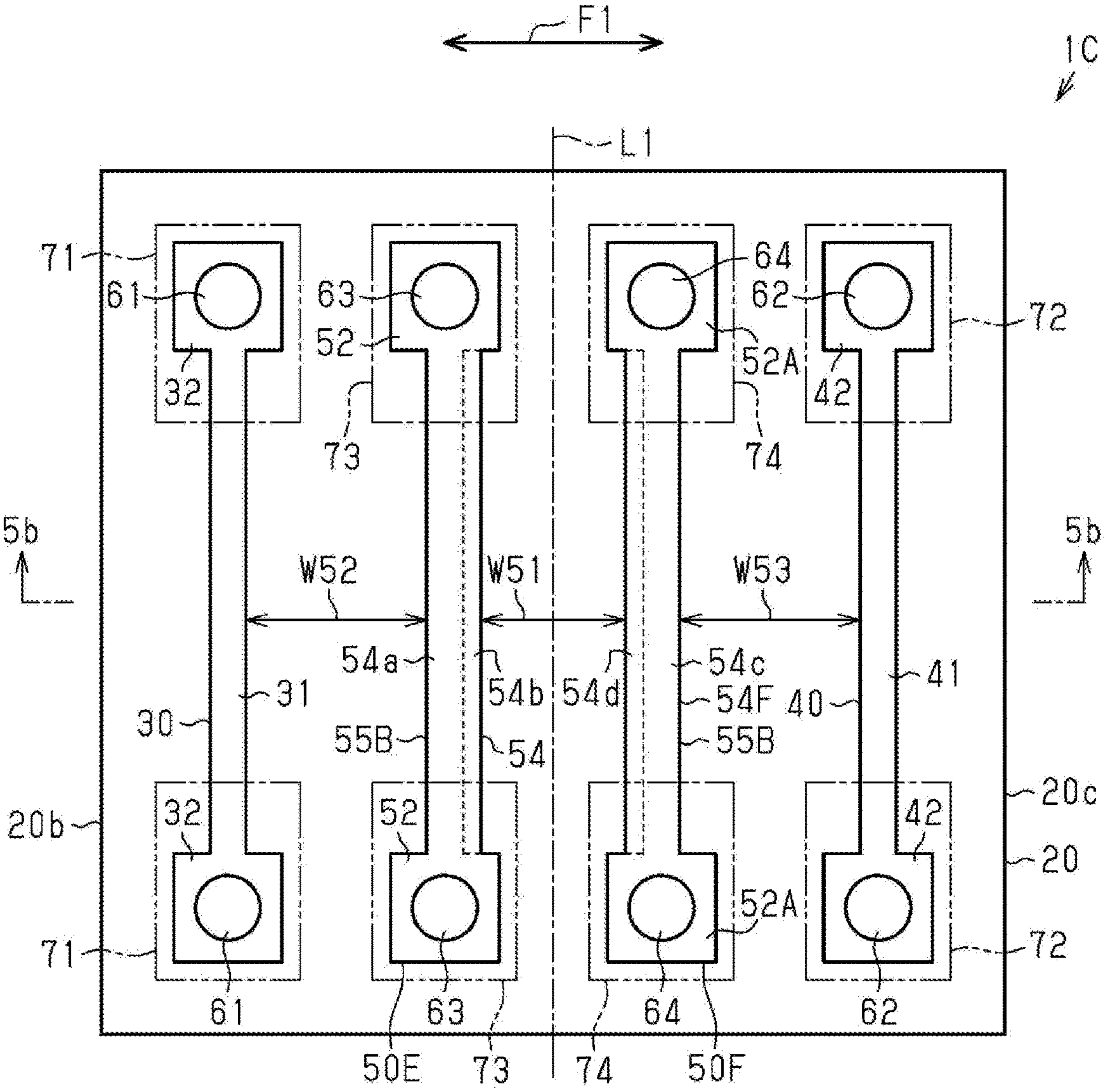
FIG. 5A is a perspective plan view of an inductor component of a modification.
Figure 5B:
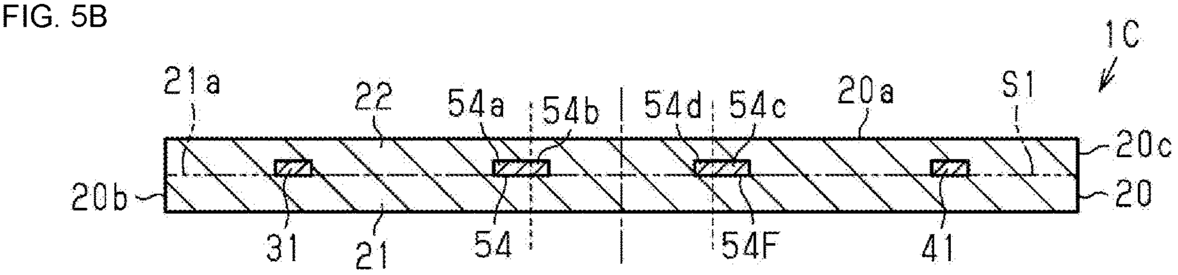
FIG. 5B is a cross-sectional view of the inductor component (a cross-sectional view taken along a line 5*b*-5*b* in FIG. 5A.

Further, for example, an inductor component 1C illustrated in FIG. 5A and FIG. 5B includes, in the inductor component 1A of the above-described second embodiment, a third inductor wiring 50E instead of the third inductor wiring 50, and a fourth inductor wiring 50F instead of the fourth inductor wiring 50A. The third and fourth inductor wirings 50E and 50F are located on the same virtual plane S1 as the first inductor wiring 30 and the second inductor wiring 40. The first to fourth inductor wirings 30, 40, 50E, and 50F are aligned at equal intervals along one direction parallel to the virtual plane S1. Further, the third inductor wiring 50E is located between the first inductor wiring 30 and the second inductor wiring 40, and the fourth inductor wiring 50F is located between the second inductor wiring 40 and the third inductor wiring 50E. The first wiring portion 31 and the second wiring portion 41 have the same wiring widths.

Each of the third and fourth inductor wirings 50E and 50F is a low-resistance inductor wiring 55B having a DC electrical resistance smaller than those of the first and second inductor wirings 30 and 40. Thicknesses of the third and fourth inductor wirings 50E and 50F (the thickness in the direction perpendicular to the virtual plane S1) are equal to the thicknesses of the first and second inductor wirings 30 and 40. The third inductor wiring 50E includes a third wiring portion 54 and the third connection portion 52 provided at both ends of the third wiring portion 54. The fourth inductor wiring 50F includes a fourth wiring portion 54F and the fourth connection portion 52A provided at both ends of the fourth wiring portion 54F. Each of the third wiring portion 54 and the fourth wiring portion 54F correspond to an example of a low-resistance wiring portion, and each of the third connection portion 52 and the fourth connection portion 52A correspond to an example of a low-resistance connection portion.

The first to fourth connection portions 32, 42, 52, and 52A located on one end side of the first to fourth wiring portions 31, 41, 54, and 54F are arranged at equal intervals in the arrangement direction F1. Further, the first to fourth connection portions 32, 42, 52, and 52A located on the other end sides of the first to fourth wiring portions 31, 41, 54, and 54F are arranged at equal intervals in the arrangement direction F1.

The third wiring portion 54 includes a base portion 54*a* having a wiring width equal to those of the first wiring portion 31 and the second wiring portion 41, and an extension portion 54*b* provided integrally with the base portion 54*a* on one side in a wiring width direction of the base portion 54*a*. In FIG. 5A, the extension portion 54*b* is an inner side portion of a broken line illustrated in the third wiring portion 54. Note that the third wiring portion 54 has a constant wiring width, and also the base portion 54*a* and the extension portion 54*b* have a constant width. In the third inductor wiring 50E, a center position in the wiring width direction of the base portion 54*a* in the arrangement direction F1 coincides with the center position in the wiring width direction of the third connection portion 52 in the arrangement direction F1.

The fourth wiring portion 54F includes a base portion 54*c* having a wiring width equal to those of the first wiring portion 31 and the second wiring portion 41, and an extension portion 54*d* provided integrally with the base portion 54*c* on one side in a wiring width direction of the base portion 54*c*. In FIG. 5A, the extension portion 54*d* is an inner side portion of a broken line illustrated in the fourth wiring portion 54F. Note that the fourth wiring portion 54F has a constant width, and also the base portion 54*c* and the extension portion 54*d* have a constant width. In the fourth inductor wiring 50F, a center position in the wiring width direction of the base portion Mc in the arrangement direction F1 coincides with the center position in the wiring width direction of the fourth connection portion 52A in the arrangement direction F1. Then, the first wiring portion 31, the second wiring portion 41, and the base portions Ma and Mc are located at equal intervals in the arrangement direction F1.

In the third inductor wiring 50E, the extension portion 54*b* is located on the side closer to the center line L1 between the first inductor wiring 30 and the second inductor wiring 40 of both sides in the wiring width direction of the base portion Ma. Specifically, in FIG. 5A, the center line L1 is located on the right side of the third inductor wiring 50E. In the third inductor wiring 50E, the extension portion 54*b* is located on the right side of the base portion Ma, that is, on the side closer to the center line L1 and farther from the first inductor wiring 30 adjacent to the third inductor wiring 50E. Accordingly, the third wiring portion 54 of the third inductor wiring 50E is closer to the side of the intermediate position between the first wiring portion 31 and the second wiring portion 41 than the third connection portion 52 in the arrangement direction F1. That is, the center in the wiring width direction of the third wiring portion 54 is located closer to the side of the intermediate position between the first wiring portion 31 and the second wiring portion 41 in the arrangement direction F1 than the center in the wiring width direction of the third connection portion 52.

In the fourth inductor wiring 50F, the extension portion 54*d* is located on the side closer to the center line L1 of both sides in the wiring width direction of the base portion 54*c*. Specifically, in FIG. 5A, the center line L1 is located on the left side of the fourth inductor wiring 50F. In the fourth inductor wiring 50F, the extension portion 54*d* is located on the left side of the base portion 54*c*, that is, on the side closer to the center line L1 and farther from the second inductor wiring 40 adjacent to the fourth inductor wiring 50F. Accordingly, the fourth wiring portion 54F of the fourth inductor wiring 50F is closer to the side of the intermediate position between the first wiring portion 31 and the second wiring portion 41 than the fourth connection portion 52A in the arrangement direction F1. That is, the center in a wiring width direction of the fourth wiring portion 54F is located closer to the side of the intermediate position between the first wiring portion 31 and the second wiring portion 41 in the arrangement direction F1 than the center in the wiring width direction of the fourth connection portion 52A.

A distance W51 between the third wiring portion 54 and the fourth wiring portion 54F is shorter than a distance W52 between the first wiring portion 31 and the third wiring portion 54 by a width of the expansion portion 54*b* and a width of the extension portion 54*d*. In other words, the distance W52 between the first wiring portion 31 and the third wiring portion 54 is longer than the distance W51 between the third wiring portion 54 and the fourth wiring portion 54F by the width of the expansion portion 54*b* and the width of the extension portion 54*d*. Further, the distance W52 between the first wiring portion 31 and the third wiring portion 54 is equal to a distance W53 between the second wiring portion 41 and the fourth wiring portion 54F.

According to the above configuration, a wiring width of the third inductor wiring 50E adjacent to the first inductor wiring 30 is extended so as to relatively widen the distance W52 between the first wiring portion 31 and the third wiring portion 54. That is, a width of the third wiring portion 54 is increased so as to relatively widen the magnetic path between the third wiring portion 54 of the third inductor wiring 50E adjacent to the first inductor wiring 30 and the first wiring portion 31. Therefore, the inductance of the inductor formed of the first inductor wiring 30 is relatively increased.

Similarly, a wiring width of the fourth inductor wiring 50F adjacent to the second inductor wiring 40 is extended so as to relatively widen the distance W53 between the second wiring portion 41 and the fourth wiring portion 54F. That is, a width of the fourth wiring portion 54F is increased so as to relatively widen the magnetic path between the fourth wiring portion 54F of the fourth inductor wiring 50F adjacent to the second inductor wiring 40 and the second wiring portion 41. Therefore, the inductance of the inductor formed of the second inductor wiring 40 is relatively increased.

By making wiring widths of the third and fourth wiring portions 54 and 54F larger than the wiring widths of the first and second wiring portions 31 and 41, DC electrical resistances of the third and fourth inductor wirings 50E and 50F are made smaller than the DC electrical resistances of the first and second inductor wirings 30 and 40. In this case, there may be a possibility that the inductance of the inductor formed of each of the first and second inductor wirings 30 and 40 located at both ends in the arrangement direction F1 is smaller than inductance of the inductor formed of each of the third and fourth inductor wirings 50E and 50F located between the first and second inductor wirings 30 and 40. In this case, it is possible to suppress the variation in the inductance of each inductor by performing the above-described method. That is, the inductor component 1C as a whole can be adjusted in a direction in which the inductance of the inductor formed of each of the first to fourth inductor wirings 30, 40, 50E, and 50F is aligned.

In the above-described first embodiment, the third inductor wiring 50 is the low-resistance inductor wiring 55 having the DC electrical resistance smaller than those of the first inductor wiring 30 and the second inductor wiring 40 because the wiring width W31 of the third wiring portion 51 is larger than the wiring width W11 of the first wiring portion 31 and the wiring width W21 of the second wiring portion 41. However, the method of making the DC electrical resistance of the third inductor wiring 50 smaller than the DC electrical resistances of the first inductor wiring 30 and the second inductor wiring 40 is not limited to this.

For example, the DC electrical resistance of the third inductor wiring 50 may be made smaller than the DC electrical resistances of the first inductor wiring 30 and the second inductor wiring 40 by making a wiring width of a part of the third wiring portion 51 larger than those of the first wiring portion 31 and the second wiring portion 41. However, in this case, the wiring width of a portion of the third wiring portion 51 whose wiring width is made to be larger than those of the first wiring portion 31 and the second wiring portion 41 is set to a value within a range of equal to or less than the wiring width W32 of the third connection portion 52.

Figure 6:
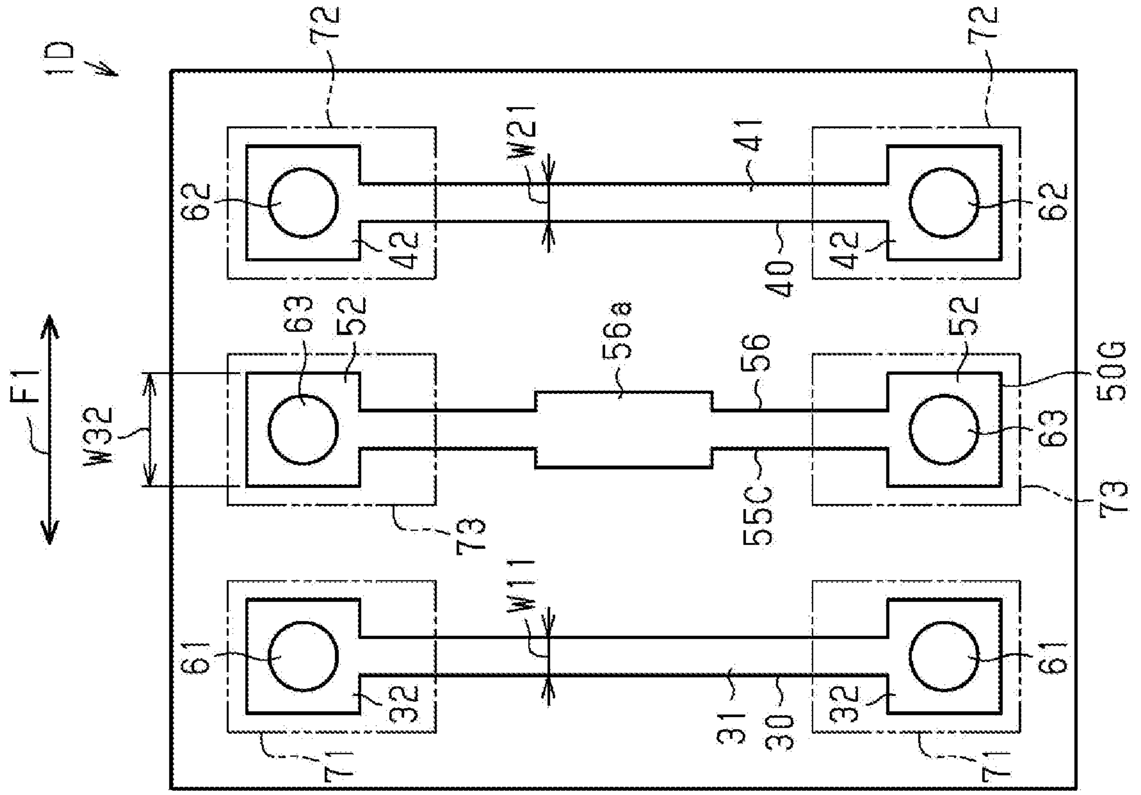
FIG. 6 is a perspective plan view of an inductor component of a modification.

In an inductor component 1D illustrated in FIG. 6, the third wiring portion 56 of a third inductor wiring 50G that is a low-resistance inductor wiring 55C has a wide portion 56*a* whose wiring width partially is increased in a central portion in a longitudinal direction. In an example illustrated in FIG. 6, a wiring width of a portion other than the wide portion 56*a* in the third wiring portion 56 is equal to the wiring widths W11 and W12 of the first and second wiring portions 31 and 41, but may be larger than the wiring widths W11 and W12 of the first and second wiring portions 31 and 41 as long as the wiring width is smaller than the wiring width W32 of the third connection portion 52.

In this manner, it is possible to suppress heat generation in the central portion in a longitudinal direction of the third inductor wiring 50G in which the heat particularly tends to be accumulated. Further, it is possible to suppress a decrease in reliability due to heat.

Figure 7:
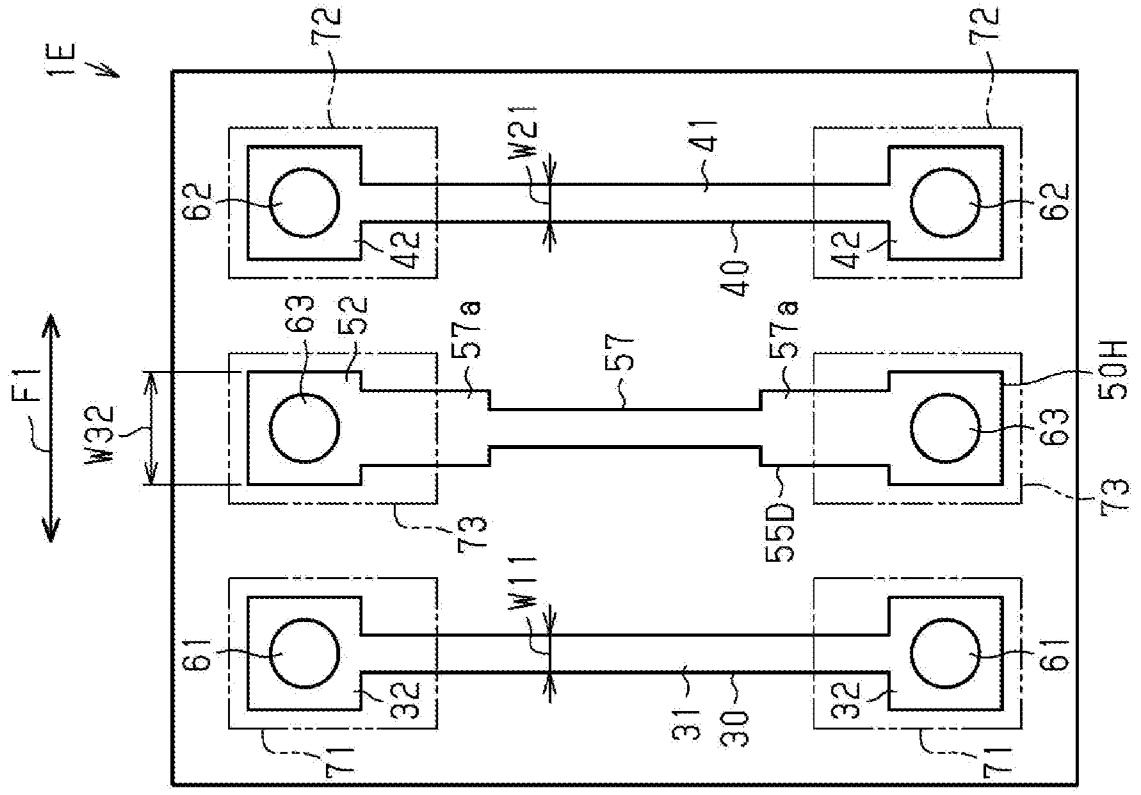
FIG. 7 is a perspective plan view of an inductor component of a modification.

In addition, in an inductor component 1E illustrated in FIG. 7, a third wiring portion 57 of a third inductor wiring 50H, which is a low-resistance inductor wiring 55D, has a wide portion 57*a* whose wiring width is partially increased at both ends. The wide portion 57*a* is adjacent to the third connection portion 52, and is provided continuously with the third connection portion 52. Note that in an example illustrated in FIG. 7, a wiring width of a portion other than the wide portion 57*a* in the third wiring portion 57 is equal to the wiring widths W11 and W12 of the first and second wiring portions 31 and 41, but may be larger than the wiring widths W11 and W12 of the first and second wiring portions 31 and 41 as long as the width is smaller than the wiring width W32 of the third connection portion 52.

In this manner, heat generation can be suppressed in the vicinity of the third connection portion 52. Therefore, it is possible to suppress the temperature rising of a connection portion between the third vertical wiring 63 connected to the third connection portion 52 and the circuit board on which the inductor component 1E is mounted. Therefore, it is easy to suppress the occurrence of electrochemical migration in the connection portion between the third vertical wiring 63 and the circuit board on which the inductor component 1E is mounted. Further, it is possible to suppress a decrease in reliability due to heat.

Further, for example, the wiring width W32 of the third connection portion 52 may be larger than the wiring widths W12 and W22 of the first and second connection portions 32 and 42.

Further, for example, by increasing a thickness of at least a part of the third inductor wiring 50 (a thickness in the direction perpendicular to the virtual plane S1) than the thicknesses of the first inductor wiring 30 and the second inductor wiring 40, the third inductor wiring 50 may be used as the low-resistance inductor wiring 55 having the DC electrical resistance smaller than those of the first inductor wiring 30 and the second inductor wiring 40.

Figure 8A:
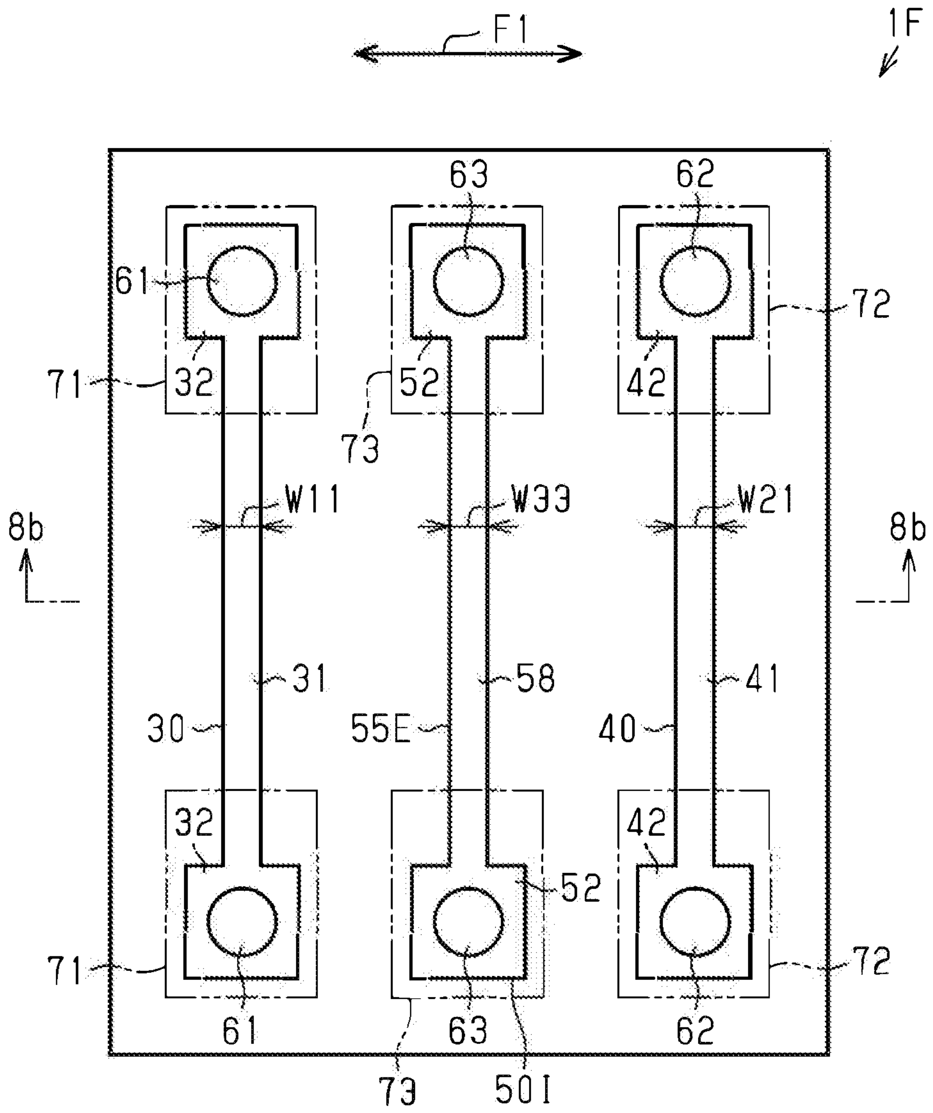
FIG. 8A is a perspective plan view of an inductor component of a modification.
Figure 8B:
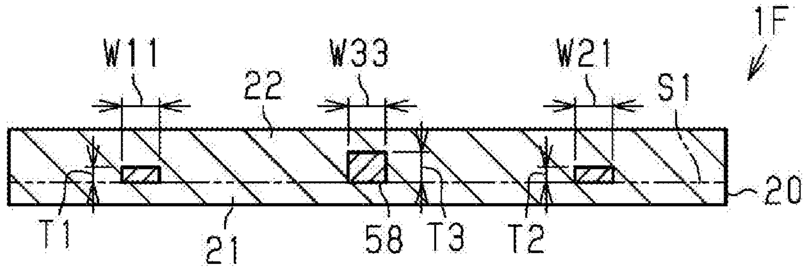
FIG. 8B is a cross-sectional view of the inductor component (a cross-sectional view taken along a line 8*b*-8*b* in FIG. 8A.

An inductor component 1F illustrated in FIG. 8A and FIG. 8B includes a third inductor wiring 50I instead of the third inductor wiring 50 in the inductor component 1 of the above-described first embodiment. The third inductor wiring 50I is located on the same virtual plane S1 as the first inductor wiring 30 and the second inductor wiring 40. The first to third inductor wirings 30, 40, and 50I are aligned at equal intervals along one direction parallel to the virtual plane S1.

The third inductor wiring 50I is a low-resistance inductor wiring 55E having a DC electrical resistance smaller than those of the first inductor wiring 30 and the second inductor wiring 40. Further, at least a part of the third inductor wiring 50I has a thickness larger than those of the first inductor wiring 30 and the second inductor wiring 40 in the direction perpendicular to the virtual plane S1. In the present example, the third inductor wiring 50I is formed to have a constant thickness T3, and the thickness T3 of the third inductor wiring 50I is larger than the thickness T1 of the first inductor wiring 30 and the thickness T2 of the second inductor wiring 40. Incidentally, the thickness T1 of the first inductor wiring 30 and the thickness T2 of the second inductor wiring 40 are equal to each other. Further, the wiring width W33 and a line length of a third wiring portion 58 of the third inductor wiring 50I are equal to the wiring width W11 and the line length of the first wiring portion 31, and the wiring width W21 and the line length of the second wiring portion 41.

Even in this manner, it is possible to suppress a decrease in reliability due to heat, as in the first embodiment described above. Further, by making at least a part of the third inductor wiring 50I thicker than the first and second inductor wirings 30 and 40, it is possible to easily make a DC electrical resistance of the third inductor wiring 50I smaller than the DC electrical resistances of the first and second inductor wirings 30 and 40.

Further, for example, by setting the line length of the third inductor wiring 50 to be shorter than the line length of the first inductor wiring 30 and the line length of the second inductor wiring 40, the third inductor wiring 50 may be the low-resistance inductor wiring 55 having the DC electrical resistance smaller than those of the first inductor wiring 30 and the second inductor wiring 40.

Figure 9:
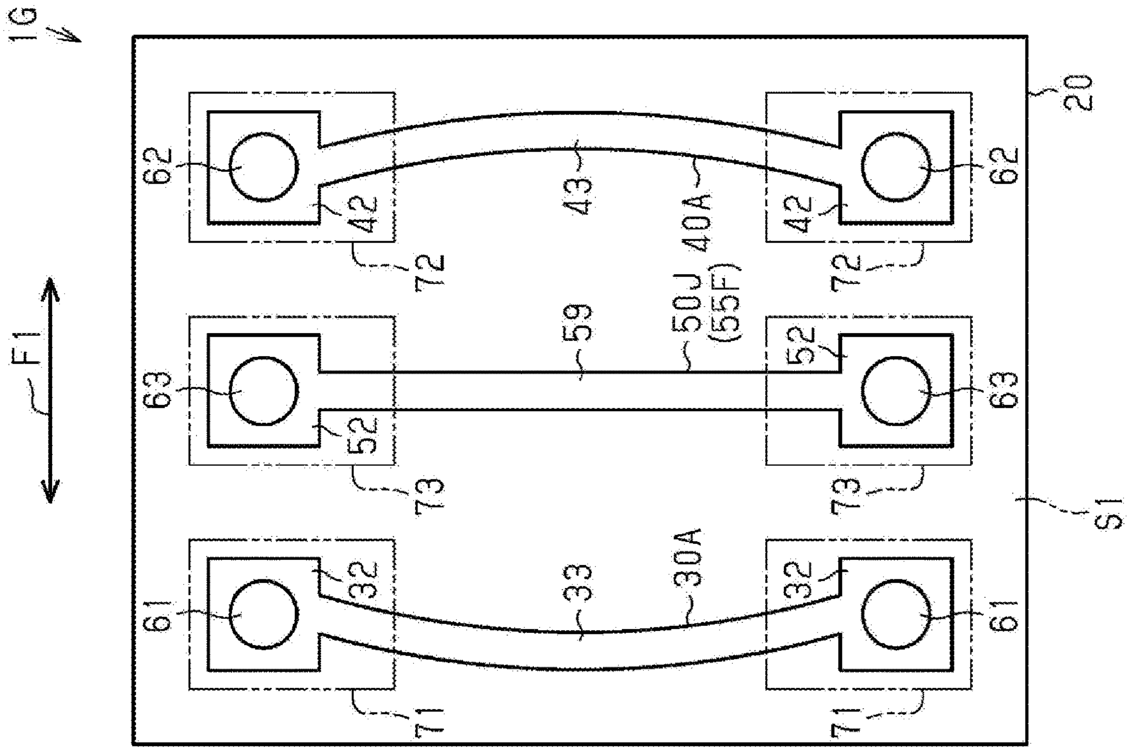
FIG. 9 is a perspective plan view of an inductor component of a modification.

In an inductor component 1G illustrated in FIG. 9, first and second wiring portions 33 and 43 of first and second inductor wirings 30A and 40A located at both ends in the arrangement direction F1 have a substantially arc shape curved toward an outer side portion of the inductor component 1G. On the other hand, a third wiring portion 59 of a third inductor wiring 50J located between the first inductor wiring 30A and the second inductor wiring 40A extends linearly along a direction orthogonal to the arrangement direction F1 and parallel to the virtual plane S1. For this reason, a line length of the third inductor wiring 50J is shorter than a line length of the first inductor wiring 30A and a line length of the second inductor wiring 40A. In an example illustrated in FIG. 9, wiring widths of the first to third wiring portions 33, 43, and 59 are equal to each other. According to this configuration, the third inductor wiring 50J is a low-resistance inductor wiring 55F having a DC electrical resistance smaller than those of the first and second inductor wirings 30A and 40A.

In this way, a DC electrical resistance of the third inductor wiring 50J can be made easily smaller than the DC electrical resistances of the first and second inductor wirings 30A and 40A. Further, it is possible to suppress a decrease in reliability due to heat.

Note that the shape of the first and second wiring portions 33 and 43 is not limited to the shape illustrated in FIG. 9, and may be a substantially arc shape, a substantially rectangular shape, a substantially wavy shape, and the like, which is curved toward an inner side portion of the inductor component 1G.

Figure 10:
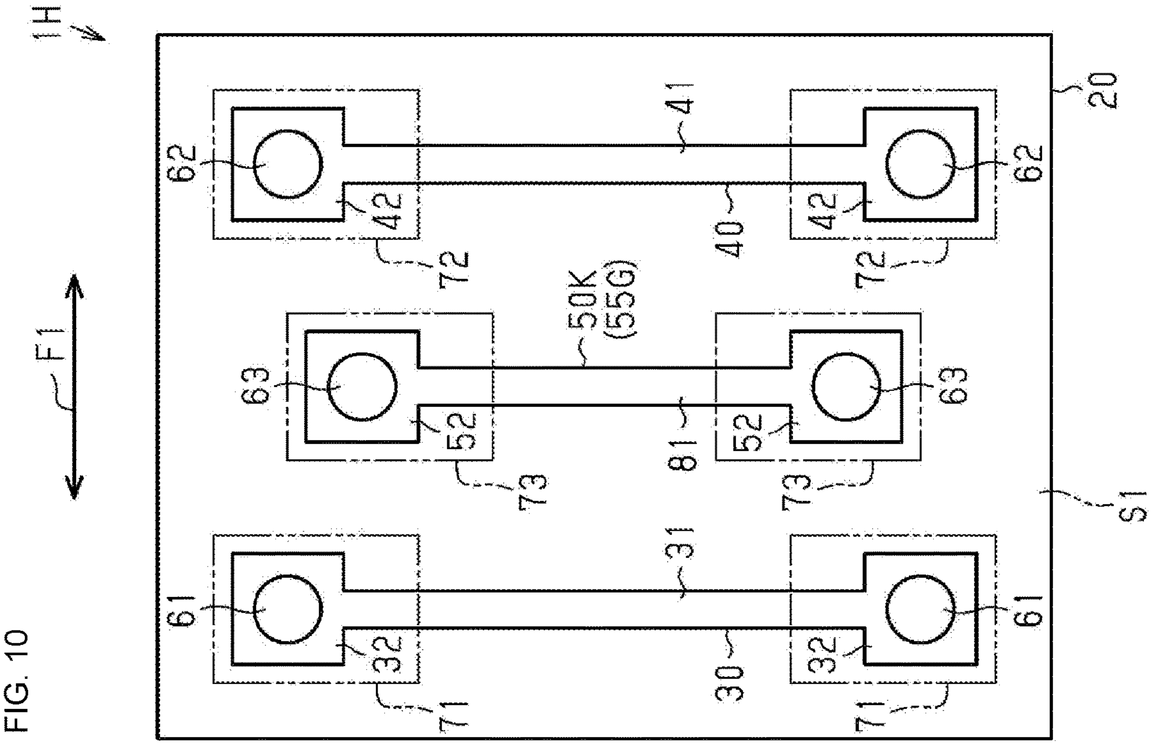
FIG. 10 is a perspective plan view of an inductor component of a modification.

In addition, in an inductor component 1H illustrated in FIG. 10, the third connection portion 52 of a third inductor wiring 50K, which is a low-resistance inductor wiring 55G, is located on an inner side portion relative to the first connection portion 32 and the second connection portion 42 in a direction (vertical direction in FIG. 10) orthogonal to the arrangement direction F1 and parallel to the virtual plane S1. In this way, even when the first and second and a third wiring portions 31, 41, and 81 do not have a complicated shape, a line length of the third inductor wiring 50K can be easily made shorter than the line length of the first inductor wiring 30 and the line length of the second inductor wiring 40. Then, a DC electrical resistance of the third inductor wiring 50K can be easily made smaller than the DC electrical resistances of the first and second inductor wirings 30 and 40. As a result, it is possible to suppress a decrease in reliability due to heat.

Further, for example, the third wiring portion 51 may be formed of a plurality of parallel wirings electrically connected in parallel between the third connection portions 52. The plurality of parallel wirings is configured such that the DC electrical resistance of the third inductor wiring 50 including the plurality of parallel wirings is smaller than the DC electrical resistances of the first and second inductor wirings 30 and 40. By configuring the third wiring portion 51 by the plurality of parallel wirings as described above, the DC electrical resistance of the third inductor wiring 50 can be easily made smaller than the DC electrical resistances of the first and second inductor wirings 30 and 40. Further, it is possible to suppress a decrease in reliability due to heat.

Figure 11:
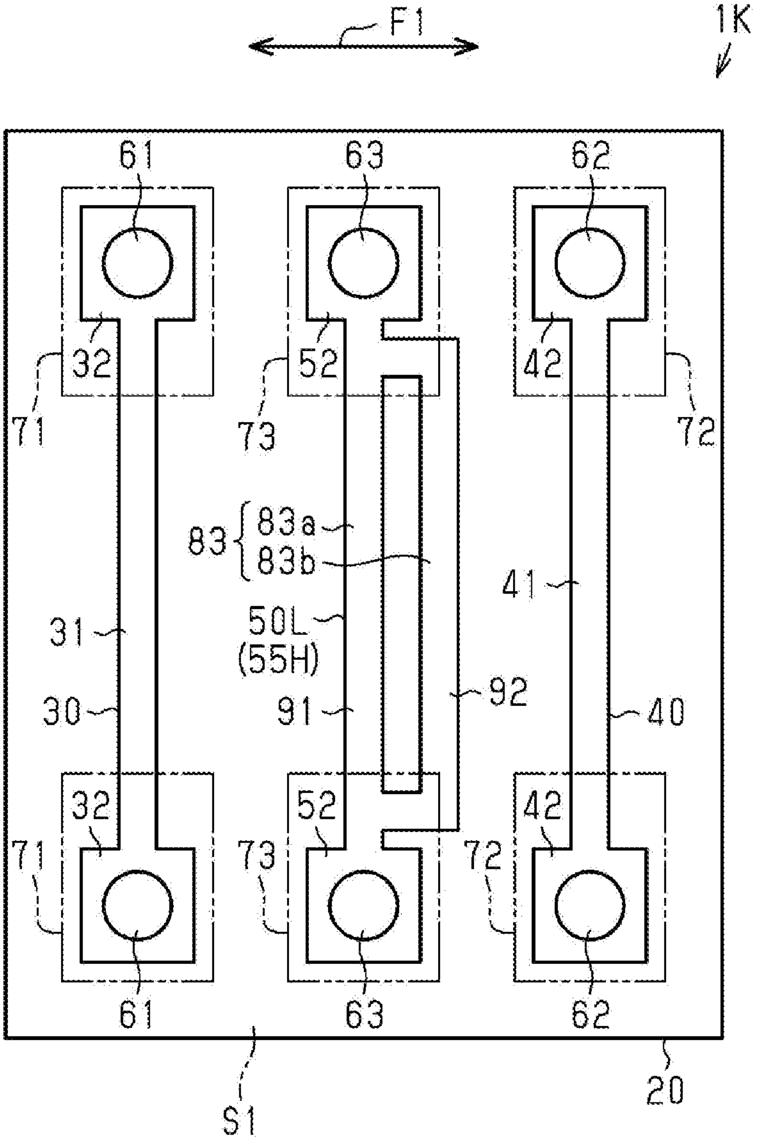
FIG. 11 is a perspective plan view of an inductor component of a modification.

In an inductor component 1K illustrated in FIG. 11, a third wiring portion 83 of a third inductor wiring 50L, which is a low-resistance inductor wiring 55H, is formed of two parallel wirings 83*a* and 83*b* that are electrically connected in parallel between the third connection portions 52. One parallel wiring 83*a* of the two parallel wirings 83*a* and 83*b* is a main wiring 91 extending on the virtual plane S1, and the remaining parallel wiring 83*b* is a sub-wiring 92 along the main wiring 91. In the inductor component 1K, the sub-wiring 92 and the main wiring 91 are located on the same virtual plane S1. In an example illustrated in FIG. 11, a wiring width of the main wiring 91 and a wiring width of the sub-wiring 92 are equal to the wiring widths of the first and second wiring portions 31 and 41, but do not necessarily have to be equal to each other. In addition, the wiring width of the main wiring 91 and the wiring width of the sub-wiring 92 may be made different from each other. Further, a line length of the sub-wiring 92 may be longer than that of the main wiring 91, or may be shorter than that of the main wiring 91. For example, the sub-wiring 92 may be shorter than the main wiring 91, and may be provided along a central portion in a longitudinal direction of the main wiring 91. Additionally, in FIG. 11, both ends of the sub-wiring 92 are connected to the main wiring 91, but may be connected to the third connection portion 52. Note that since the third inductor wiring SOL is the low-resistance inductor wiring 55H, the third wiring portion 83 corresponds to an example of a low-resistance wiring portion, and the third connection portion 52 provided at both ends of the third wiring portion 83 corresponds to an example of a low-resistance connection portion.

In this manner, it is possible to easily make a DC electrical resistance of the third inductor wiring SOL smaller than the DC electrical resistances of the first and second inductor wirings 30 and 40. Thus, it is possible to suppress a decrease in reliability due to heat.

Figure 12A:
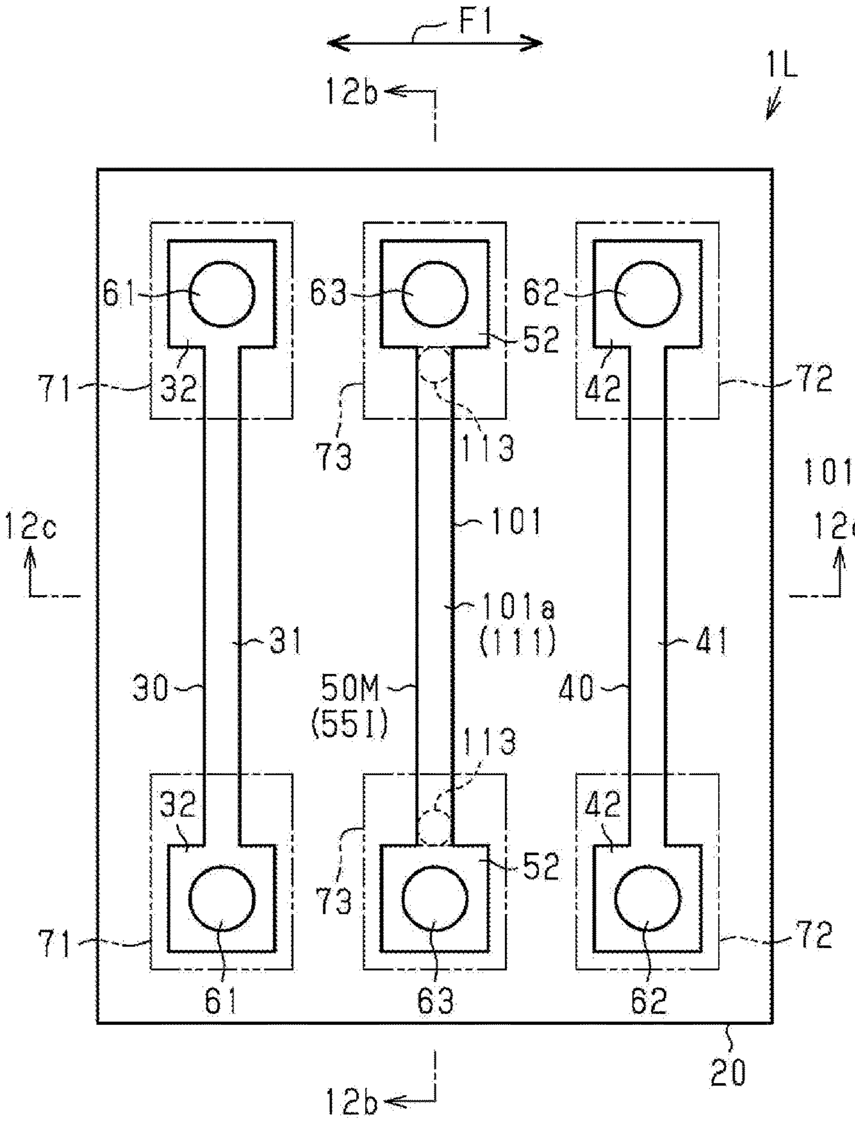
FIG. 12A is a perspective plan view of an inductor component according to a modification.
Figure 12B:
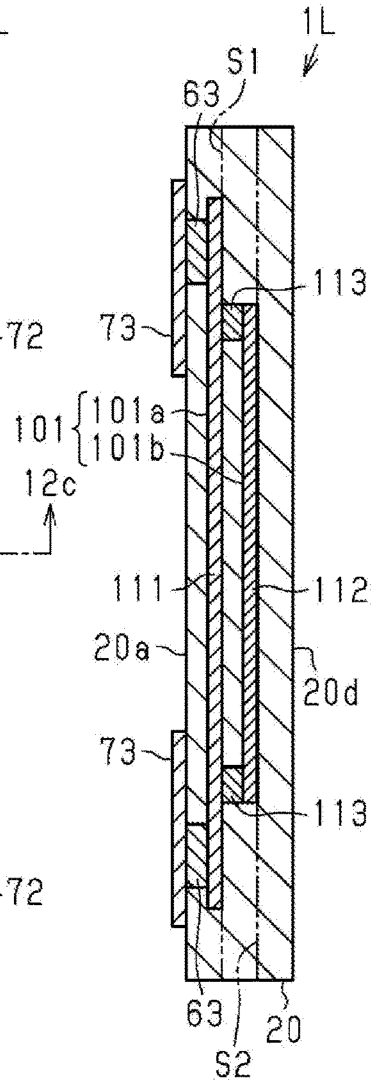
FIG. 12B is a cross-sectional view of the inductor component (a cross-sectional view taken along a line 12*b*-12*b* in FIG. 12A)
Figure 12C:
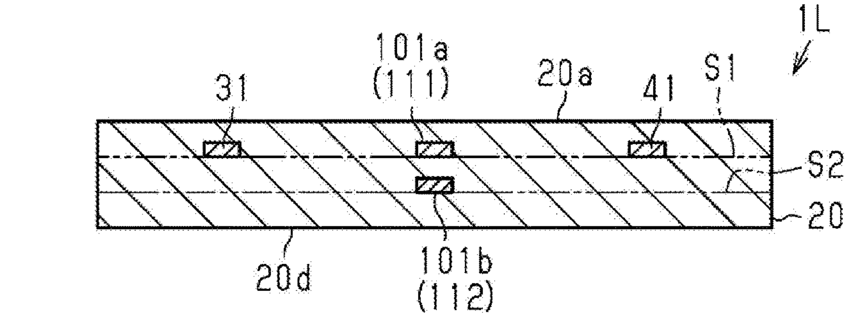
FIG. 12C is a cross-sectional view of the inductor component (a cross-sectional view taken along a line 12*c*-12*c* in FIG. 12A)

Further, in an inductor component 1L illustrated in FIG. 12A, FIG. 12B, and FIG. 12C, a third wiring portion 101 of a third inductor wiring 50M, which is a low-resistance inductor wiring 55I, is formed of two parallel wirings 101*a* and 101*b* electrically connected in parallel between the third connection portions 52. One parallel wiring 101*a* of the two parallel wirings 101*a* and 101*b* is a main wiring 111 extending on the virtual plane S1, and the remaining parallel wiring 101*b* is a sub-wiring 112 extending parallel to the virtual plane S1 on a plane S2 different from the virtual plane S1. Note that in the inductor component 1L of the present example, the plane S2 is a plane that is a plane parallel to the virtual plane S1, which is a main surface of the magnetic material layer having the lower surface 20*d* among the three magnetic material layers configuring the main body 20. The sub-wiring 112 is located at a position overlapping the main wiring 111 in the direction perpendicular to the virtual plane S1. In the inductor component 1L, the sub-wiring 112 is located on the lower surface 20*d* side of the inductor component 1L (the side opposite to the mounting surface) with respect to the main wiring 111, but may be configured to be located on the upper surface 20*a* side (mounting surface side) of the inductor component 1L with respect to the main wiring 111. Both end portions of the sub-wiring 112 are connected to both end portions of the main wiring 111 with via wirings 113 interposed therebetween. In FIG. 12, a wiring width of the main wiring 111 and a wiring width of the sub-wiring 112 are equal to the wiring widths of the first and second wiring portions 31 and 41, but do not necessarily have to be equal to each other. In addition, the wiring width of the main wiring 111 and the wiring width of the sub-wiring 112 may be made different from each other. Further, a line length of the sub-wiring 112 may be longer than that of the main wiring 111, or may be shorter than that of the main wiring 111. For example, the sub-wiring 112 may be shorter than the main wiring 111, and may be provided along a central portion in a longitudinal direction of the main wiring 111. In addition, in the inductor component 1L, both ends of the sub-wiring 112 are connected to the main wiring 111, but may be connected to the third connection portion 52. Note that since the third inductor wiring 50M is the low-resistance inductor wiring 55I, the third wiring portion 101 corresponds to an example of a low-resistance wiring portion, and the third connection portion 52 provided at both ends of the third wiring portion 101 corresponds to an example of a low-resistance connection portion.

In this way, it is possible to easily make a DC electrical resistance of the third inductor wiring 50M smaller than the DC electrical resistances of the first and second inductor wirings 30 and 40. Further, it is possible to suppress a decrease in reliability due to heat.

Note that the above modification can be similarly implemented in the fourth inductor wiring 50A of the above-described second embodiment. That is, the above-described modification may be implemented in any of the low-resistance inductor wirings located between the first inductor wiring 30 and the second inductor wiring 40.

In the above-described second embodiment, the inductor component 1A includes two inductor wirings, i.e., the third inductor wiring 50 and the fourth inductor wiring 50A, between the first inductor wiring 30 and the second inductor wiring 40. However, the inductor component 1A may further include a fifth inductor wiring between the first inductor wiring 30 and the third inductor wiring 50.

Figure 13A:
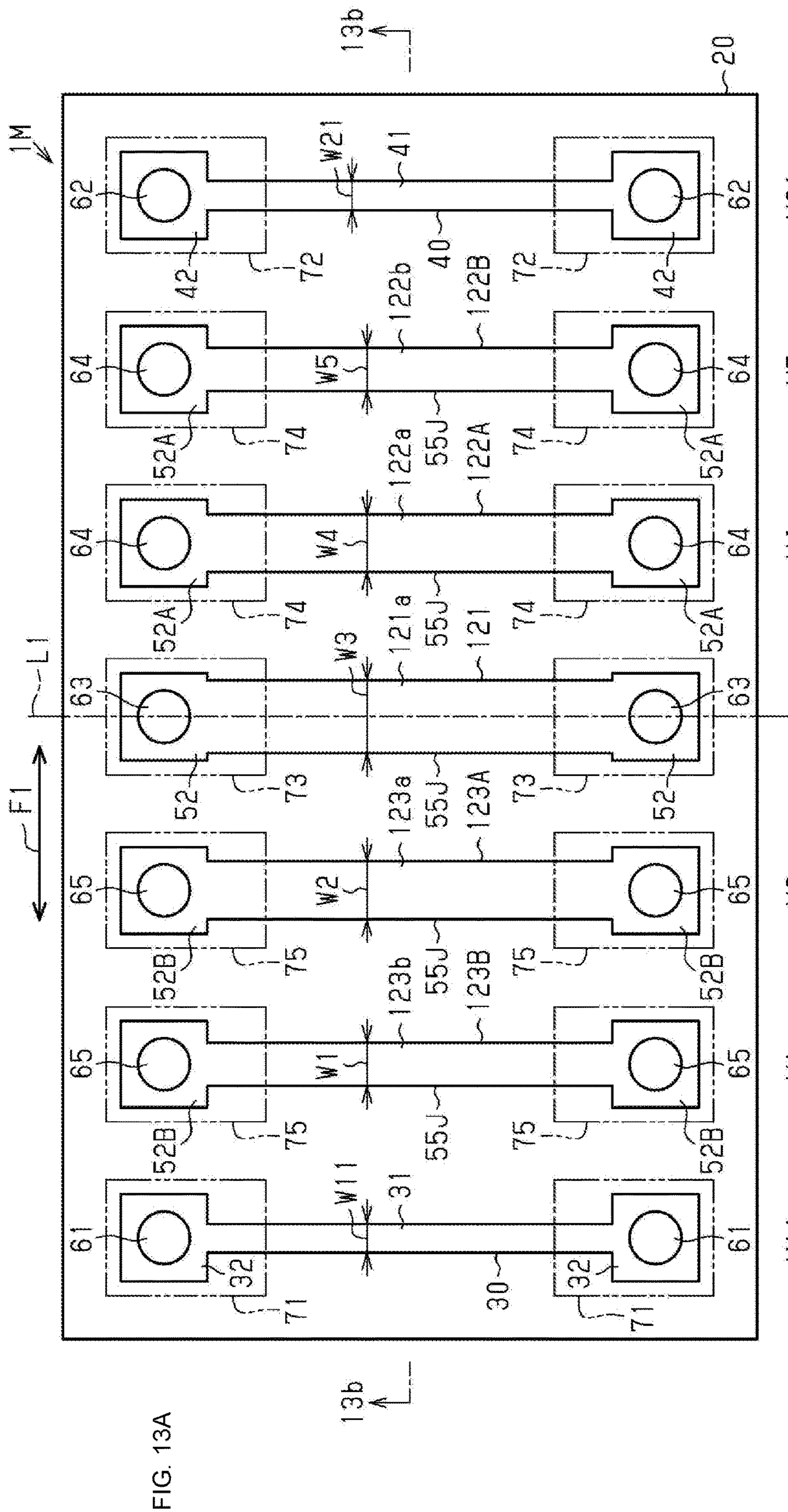
FIG. 13A is a perspective plan view of an inductor component of a modification.
Figure 13B:
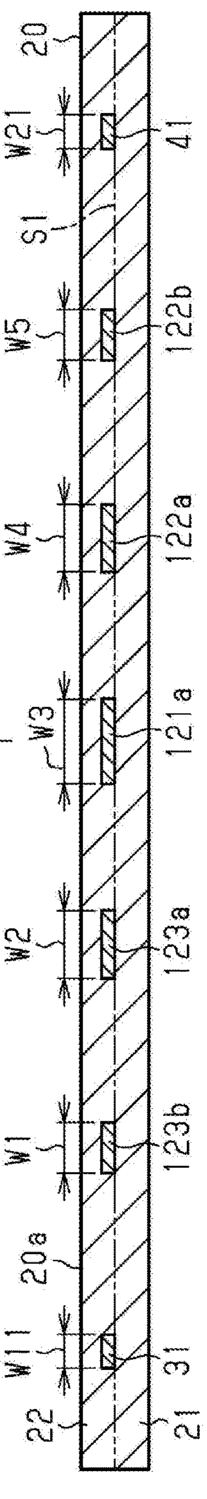
FIG. 13B is a cross-sectional view of the inductor component (a cross-sectional view taken along a line 13*b*-13*b* in FIG. 13A.

For example, the inductor component 1M illustrated in FIG. 13A and FIG. 13B includes one third inductor wiring 121 extending in parallel to the virtual plane S1 in which the first inductor wiring 30 extends, between the first inductor wiring 30 and the second inductor wiring 40. In addition, the inductor component 1M has two fourth inductor wirings 122A and 122B extending parallel to the virtual plane S1 between the second inductor wiring 40 and the third inductor wiring 121. Further, the inductor component 1M includes two fifth inductor wirings 123A and 123B extending in parallel to the virtual plane S1 between the first inductor wiring 30 and the third inductor wiring 121. The third inductor wiring 121, the fourth inductor wirings 122A and 122B, and the fifth inductor wirings 123A and 123B are a low-resistance inductor wiring 55J having a DC electrical resistance smaller than those of the first and second inductor wirings 30 and 40. Then, the third inductor wiring 121 has a smaller DC electrical resistance than those of the fourth inductor wirings 122A and 122B and the fifth inductor wirings 123A and 123B.

In the present example, the third inductor wiring 121, the fourth inductor wirings 122A and 122B, and the fifth inductor wirings 123A and 123B are located on the virtual plane S1. Then, in order from the first inductor wiring 30 side, the fifth inductor wiring 123B, the fifth inductor wiring 123A, the third inductor wiring 121, the fourth inductor wiring 122A, and the fourth inductor wiring 122B are arranged in this order at equal intervals.

The third inductor wiring 121 includes a third wiring portion 121*a*, and the third connection portion 52 provided at both ends of the third wiring portion 121*a*. The fourth inductor wiring 122A located between the second inductor wiring 40 and the third inductor wiring 121 includes a fourth wiring portion 122*a* and the fourth connection portion 52A provided at both ends of the fourth wiring portion 122*a*. The fifth inductor wiring 123A located between the first inductor wiring 30 and the third inductor wiring 121 includes a fifth wiring portion 123*a* and a fifth connection portion 52B provided at both ends of the fifth wiring portion 123*a*. The fourth inductor wiring 122B located between the second inductor wiring 40 and the fourth inductor wiring 122A includes a fourth wiring portion 122*b* and the fourth connection portion 52A provided at both ends of the fourth wiring portion 122*b*. The fifth inductor wiring 123B located between the first inductor wiring 30 and the fifth inductor wiring 123A has a fifth wiring portion 123*b* and the fifth connection portion 52B provided at both ends of the fifth wiring portion 123*b*. Note that since the third to fifth inductor wirings 121, 122A, 122B, 123A, and 123B are all the low-resistance inductor wiring 55J, each of the third wiring portion 121*a*, the fourth wiring portions 122*a* and 122*b*, and the fifth wiring portions 123*a* and 123*b* corresponds to an example of a low-resistance wiring portion. Further, each of the third to fifth connection portions 52, 52A, and 52B corresponds to an example of a low-resistance connection portion.

The fifth wiring portions 123*a* and 123*b* have a substantially belt-like shape extending linearly along a direction orthogonal to the arrangement direction F1 and parallel to the virtual plane S1. The fifth wiring portions 123*a* and 123*b* extend in parallel to the first wiring portion 31 and the second wiring portion 41. The fifth wiring portions 123*a* and 123*b* are formed to have the constant wiring width W1 and W2, respectively and a constant thickness. Further, a line length of the fifth wiring portions 123*a* and 123*b* is equal to the line length of the first wiring portion 31 and the line length of the second wiring portion 41.

The fifth connection portion 52B has the same shape as those of the third connection portion 52 and the fourth connection portion 52A. However, the fifth connection portion 52B may have a shape different from those of the third connection portion 52 and the fourth connection portion 52A.

A fifth vertical wiring 65 is connected to each fifth connection portion 52B. The fifth vertical wiring 65 is provided inside the main body 20. The fifth vertical wiring 65 passes through the inside of the main body 20 from each of the fifth inductor wirings 123A and 123B to the surface of the main body 20 in a direction perpendicular to the virtual plane S1. Specifically, the fifth vertical wiring 65 extends from an upper surface of the fifth connection portion 52B in the direction perpendicular to the virtual plane S1, and passes through the inside of the magnetic material layer 22 in the direction perpendicular to the virtual plane S1. An upper end surface of the fifth vertical wiring 65 is exposed to the outside of the main body 20 from the upper surface 20*a* of the main body 20. Further, the fifth vertical wiring 65 is electrically connected to the fifth connection portion 52B. Each of the upper end surfaces of the fifth vertical wirings 65 exposed to the outside from the upper surface 20*a* of the main body 20 is covered with a fifth external terminal 75. The fifth vertical wiring 65 is made of, for example, a material similar to those of the first to fourth vertical wirings 61 to 64. Further, the fifth external terminal 75 is made of, for example, a material similar to those of the first to fourth external terminals 71 to 74.

In the inductor component 1M, the low-resistance inductor wiring 55J closer to the intermediate position between the first inductor wiring 30 and the second inductor wiring 40 has a smaller DC electrical resistance. In FIG. 13A, the center line L1 that passes through the intermediate position between the first inductor wiring 30 and the second inductor wiring 40, while perpendicular to the arrangement direction F1, and extends in parallel to the virtual plane S1 is illustrated by a dashed-dotted line. The third inductor wiring 121 closest to the center line L1, i.e., closest to the intermediate position between the first inductor wiring 30 and the second inductor wiring 40, is located on the center line L1 in the present example. The third inductor wiring 121 has the smallest DC electrical resistance among five low-resistance inductor wirings 55J. The fourth inductor wiring 122A and the fifth inductor wiring 123A, which are second closest to the center line L1, are located on both sides of the third inductor wiring 121. These fourth inductor wiring 122A and fifth inductor wiring 123A have the DC electrical resistance that is second smallest among those of the five low-resistance inductor wirings 55J. The remaining fourth inductor wiring 122B and fifth inductor wiring 123B are the third closest to the center line L1, and have the DC electrical resistance that is third smallest among those of the five low-resistance inductor wirings 55J. In the example illustrated in FIG. 13, the third to fifth inductor wirings 121, 122A, 122B, 123A, and 123B are constant in thickness. By making wiring widths of the third wiring portion 121*a*, the fourth wiring portions 122*a* and 122*b*, and the fifth wiring portions 123*a* and 123*b* different from each other, cross-sectional areas of the third wiring portion 121*a*, the fourth wiring portions 122*a* and 122*b*, and the fifth wiring portions 123*a* and 123*b* are made different from each other, and magnitudes of the DC electrical resistance are made different from each other. Specifically, a wiring width W3 of the third wiring portion 121*a* of the third inductor wiring 121 closest to the center line L1 is made to be largest, and wiring widths W4 and W2 of the fourth and fifth wiring portions 122*a* and 123*a* of the fourth and fifth inductor wirings 122A and 123A second closest to the center line L1 are made to be second largest. Further, the wiring widths W5 and W1 of the fourth and fifth wiring portions 122*b* and 123*b* of the fourth and fifth inductor wirings 122B and 123B third closest to the center line L1 are made to be third largest. However, the wiring widths W5 and W1 of the fourth and fifth wiring portions 122*b* and 123*b* are larger than the wiring widths W11 and W21 of the first and second wiring portions 31 and 41. Accordingly, the cross-sectional areas of the third to fifth wiring portions 121*a*, 122*a*, 122*b*, 123*a*, and 123*b* are increased in the low-resistance inductor wiring 55J closer to the intermediate position between the first inductor wiring 30 and the second inductor wiring 40.

Note that the method of making the cross-sectional areas of the third to fifth wiring portions 121*a*, 122*a*, 122*b*, 123*a*, and 123*b* larger in the low-resistance inductor wiring 55J that is closer to the intermediate position between the first inductor wiring 30 and the second inductor wiring 40 is not limited to this. For example, all the wiring widths W1 to W5 may be set to be constant, and the thicknesses of the third to fifth wiring portions 121*a*, 122*a*, 122*b*, 123*a*, and 123*b* may be larger in the low-resistance inductor wiring 55J that is closer to the intermediate position between the first inductor wiring 30 and the second inductor wiring 40. Further, for example, the widths of the third to fifth wiring portions 121*a*, 122*a*, 122*b*, 123*a*, and 123*b* may be larger and the thicknesses thereof may be larger in the low-resistance inductor wirings 55J closer to the intermediate position between the first inductor wiring 30 and the second inductor wiring 40.

In general, in a case of an inductor component including a plurality of inductor wirings having the same wiring width and line length and having the same DC electrical resistance, in the plurality of inductor wirings aligned on the same virtual plane, the temperature of the inductor wiring closer to the intermediate position of the inductor wirings at both ends tends to be higher. Therefore, in the present example, the DC electrical resistance of the third inductor wiring 121 is made smaller than the DC electrical resistances of the fourth inductor wirings 122A and 122B and the DC electrical resistances of the fifth inductor wirings 123A and 123B, so that the DC electrical resistance of the low-resistance inductor wiring 55J closest to the intermediate position between the first and second inductor wirings 30 and 40 is made smallest. Therefore, even when the current flows through each of the first to fifth inductor wirings 30, 40, 121, 122A, 122B, 123A, and 123B in the same manner, it is possible to suppress the temperature locally becoming high in the vicinity, in which heat particularly tends to be accumulated, of the intermediate position between the first inductor wiring 30 and the second inductor wiring 40. As a result, it is possible to suppress a decrease in reliability due to heat.

Further, the cross-sectional areas of the third to fifth wiring portions 121*a*, 122*a*, 122*b*, 123*a*, and 123*b* are made to be larger in the low-resistance inductor wiring 55J closer to the intermediate position between the first inductor wiring 30 and the second inductor wiring 40. As a result, it is possible to easily make a configuration in which the low-resistance inductor wiring 55J closer to the intermediate position between the first inductor wiring 30 and the second inductor wiring 40 has a smaller DC electrical resistance. Further, even when the current flows through each of the first to fifth inductor wirings 30, 40, 121, 122A, 122B, 123A, and 123B in the same manner, the low-resistance inductor wiring 55J closer to the intermediate position between the first inductor wiring 30 and the second inductor wiring 40 can suppress the heat generation.

Note that the number of the plurality of low-resistance inductor wiring lines 55J disposed between the first inductor wiring 30 and the second inductor wiring 40 is not limited to five. For example, the number of fourth inductor wirings, which is the low-resistance inductor wirings 55J located between the second inductor wiring 40 and the third inductor wiring 121, may be one or equal to or more than three. Further, for example, the number of fifth inductor wirings, which is the low-resistance inductor wirings 55J located between the first inductor wiring 30 and the third inductor wiring 121, may be one or equal to or more than three.

In addition, in a case where a plurality of low-resistance inductor wirings is positioned between the first inductor wiring 30 and the second inductor wiring 40, the low-resistance inductor wiring closer to the intermediate position between the first inductor wiring 30 and the second inductor wiring 40 does not necessarily have to be configured to have a smaller DC electrical resistance. For example, the DC electrical resistances of all low-resistance inductor wirings may be equal.

In addition, when a plurality of inductor wirings is located between the first inductor wiring 30 and the second inductor wiring 40, all the inductor wirings need not necessarily be a low-resistance inductor wiring. It is sufficient that at least one inductor wiring of the plurality of inductor wirings located between the first inductor wiring 30 and the second inductor wiring 40 is the third inductor wiring, i.e., the low-resistance inductor wiring.

In the above-described first embodiment, all of the first to third vertical wirings 61 to 63 have the cross-sectional areas of the same size. However, the sizes of the cross-sectional areas of the first to third vertical wirings 61 to 63 may be different from each other. Note that the cross-sectional area of the vertical wiring refers to an area through which the current passes, and specifically, refers to an area of a cross-section parallel to the virtual plane.

Figure 14A:
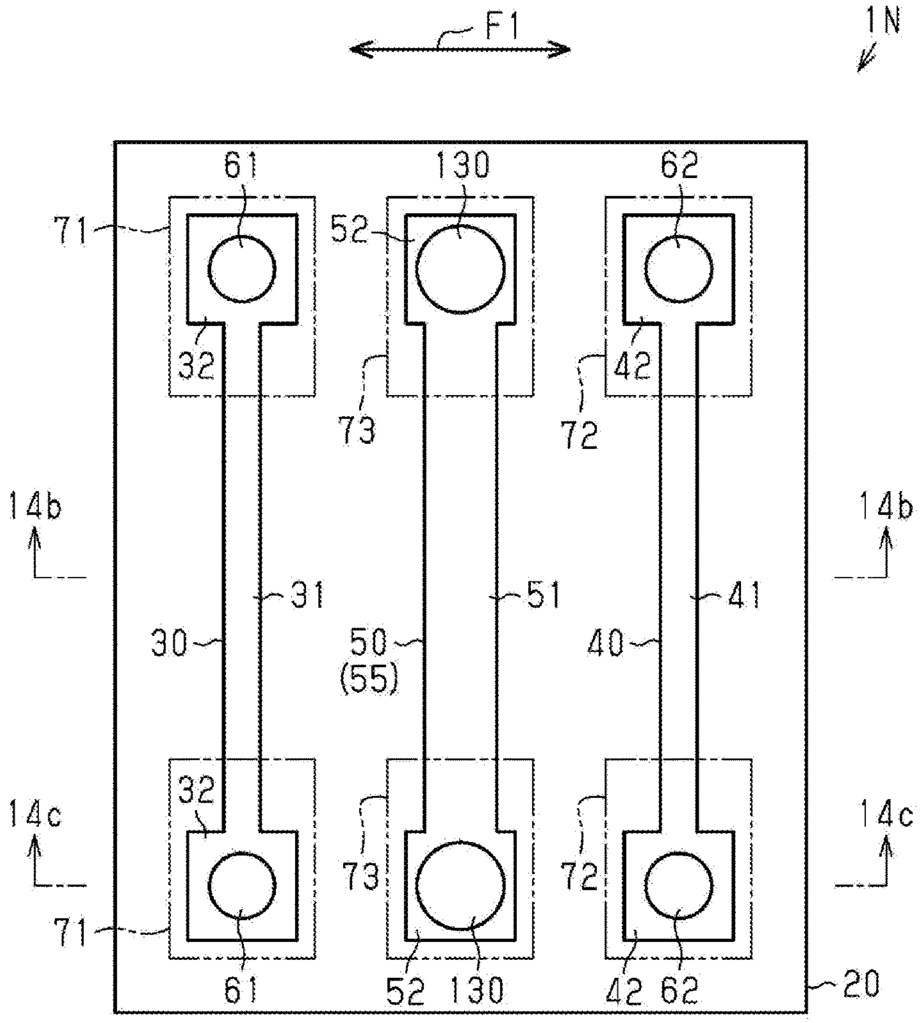
FIG. 14A is a perspective plan view of an inductor component according to a modification.
Figure 14B:
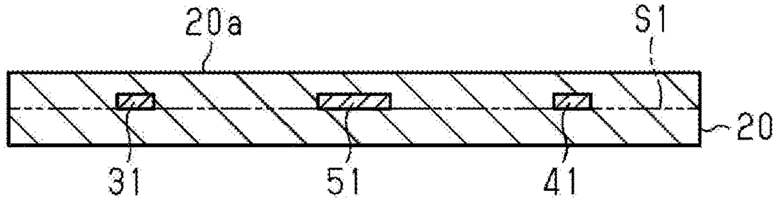
FIG. 14B is a cross-sectional view of the inductor component (a cross-sectional view taken along a line 14*b*-14*b* in FIG. 14A)
Figure 14C:
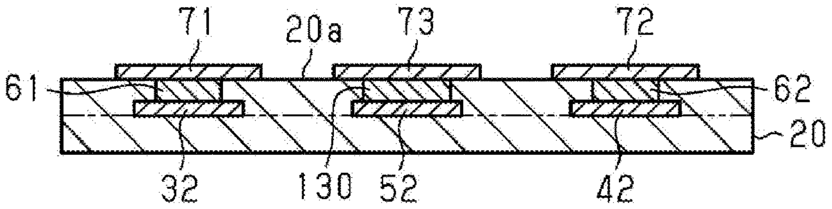
FIG. 14C is a cross-sectional view of the inductor component (a cross-sectional view taken along a line 14*c*-14*c* in FIG. 14A)

For example, in an inductor component 1N illustrated in FIG. 14A, FIG. 14B, and FIG. 14C, a third vertical wiring 130 connected to the third inductor wiring 50, which is the low-resistance inductor wiring 55, has a cross-sectional area larger than those of the first vertical wiring 61 connected to the first inductor wiring 30 and the second vertical wiring 62 connected to the second inductor wiring 40. In the inductor component 1N, a diameter of the third vertical wiring 130 is larger than a diameter of the first vertical wiring 61 and a diameter of the second vertical wiring 62. As described above, by increasing a cross-sectional area of the third vertical wiring 130 close to a connection portion with the circuit board on which the electrochemical migration is likely to occur, heat generation in the third vertical wiring 130 can be suppressed, and heat dissipation property can be improved. Therefore, the occurrence of electrochemical migration at the connection portion between the inductor component 1N and the circuit board can be more easily suppressed. Note that the above-described second embodiment may be modified in the same manner.

Figure 15A:
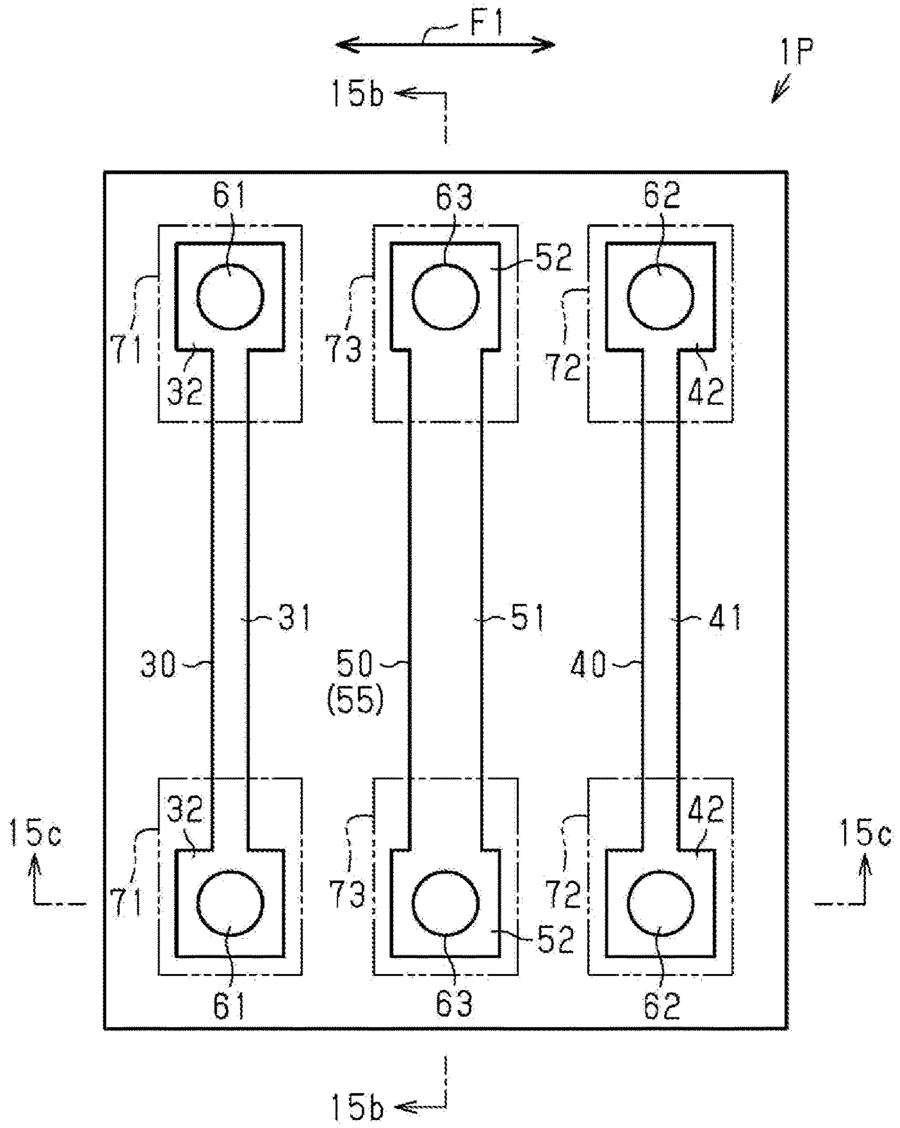
FIG. 15A is a perspective plan view of an inductor component according to a modification.
Figure 15B:
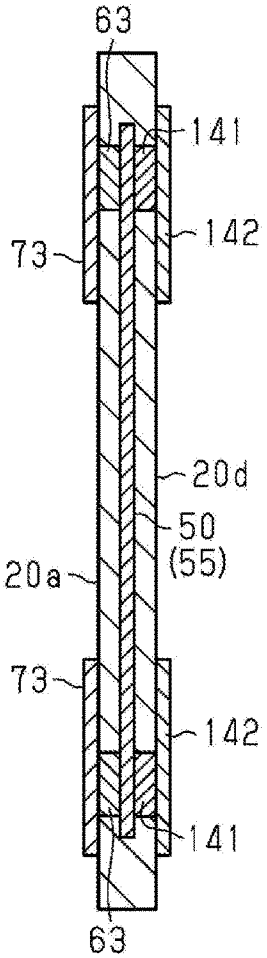
FIG. 15B is a cross-sectional view of the inductor component (a cross-sectional view taken along a line 15*b*-15*b* in FIG. 15A)
Figure 15C:
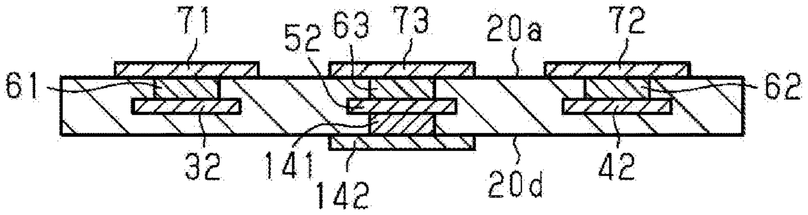
FIG. 15C is a cross-sectional view of the inductor component (a cross-sectional view taken along a line 15*c*-15*c* in FIG. 15A)

As illustrated in FIG. 15A, FIG. 15B, and FIG. 15C, a third external terminal 142 that is exposed to the outside and is connected to the third inductor wiring 50, which is the low-resistance inductor wiring 55, with the third vertical wiring 141 interposed therebetween may be provided also on the lower surface 20*d* parallel to the virtual plane S1 of the main body 20. In the present example, the third vertical wiring 141 passes through the main body 20 in a direction perpendicular to the virtual plane S1 from a lower surface of the third connection portion 52 to the lower surface 20*d* of the main body 20. Then, the third external terminal 142 covers a lower end surface of the third vertical wiring 141 exposed from the lower surface 20*d* of the main body 20. Then, the third vertical wiring 141 is electrically connected to the third connection portion 52 and the third external terminal 142.

In this way, it is possible to increase the degree of freedom in mounting of an inductor component 1P. Further, heat of the low-resistance inductor wiring 55 can also be dissipated from the third external terminal 142 exposed to the outside from the lower surface 20*d*. Therefore, since the heat dissipation property of the low-resistance inductor wiring 55 is improved, it is possible to suppress the occurrence of electrochemical migration in the connection portion between the low-resistance inductor wiring 55 and the circuit board. As a result, it is possible to further suppress a decrease in reliability due to heat. Note that the above-described second embodiment may be modified in the same manner.

Figure 16A:
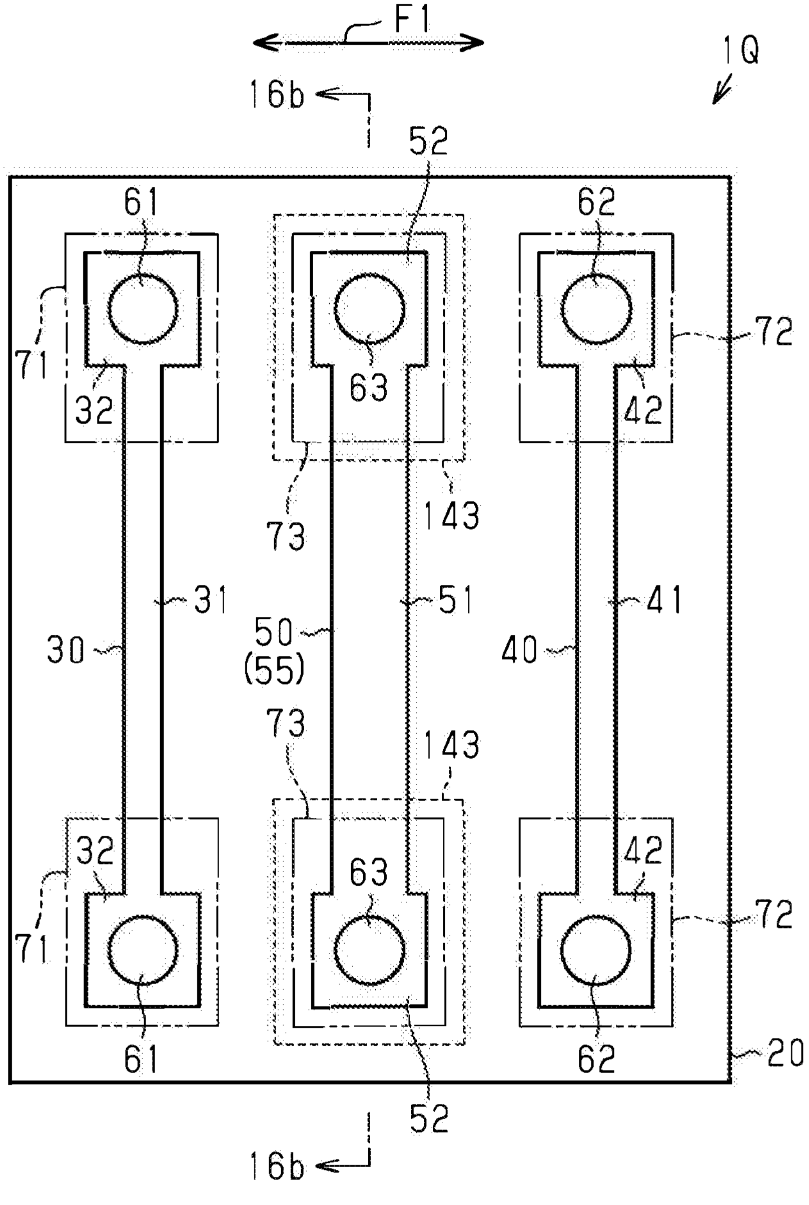
FIG. 16A is a perspective plan view of an inductor component of a modification.
Figure 16B:
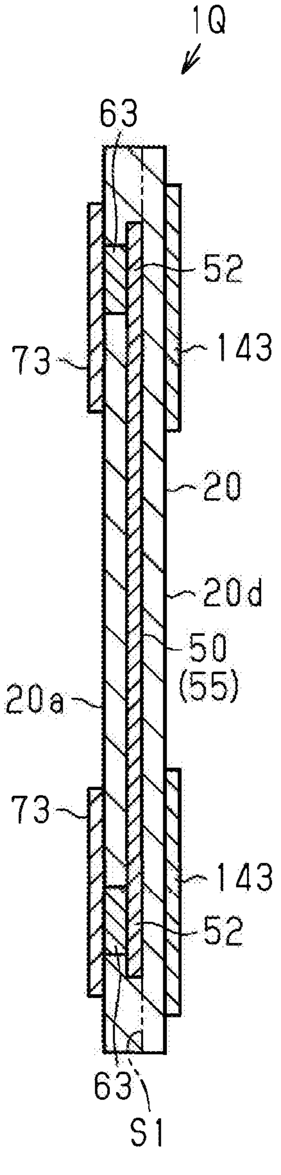
FIG. 16B is a cross-sectional view of the inductor component (a cross-sectional view taken along a line 16*b*-16*b* in FIG. 16A)

As in an inductor component 1Q illustrated in FIG. 16A and FIG. 16B, a dummy terminal 143 that is exposed to the outside and is not electrically connected to any of the first to third vertical wirings 61 to 63 may be provided on at least one of the upper surface 20*a* and the lower surface 20*d* that are parallel to the virtual plane S1 of the main body 20. In the present example, the dummy terminal 143 is provided on the lower surface 20*d* of the main body 20. Further, in the present example, the dummy terminal 143 is provided on the lower surface 20*d* of the main body 20 at a position overlapping the third connection portion 52 and the third vertical wiring 63 of the third inductor wiring 50, which is the low-resistance inductor wiring 55 in a direction perpendicular to the virtual plane S1. In this way, since heat can be dissipated from the dummy terminal 143, it is possible to further suppress a decrease in reliability due to heat.

In the above-described first embodiment, the first to third inductor wirings 30, 40, and 50 are located on the same virtual plane S1, and the first to third inductor wirings 30, 40, and 50 are arranged in the planar direction of the virtual plane S1. However, the arrangement direction of the first to third inductor wirings 30, 40, and 50 is not limited to this.

Figure 17A:
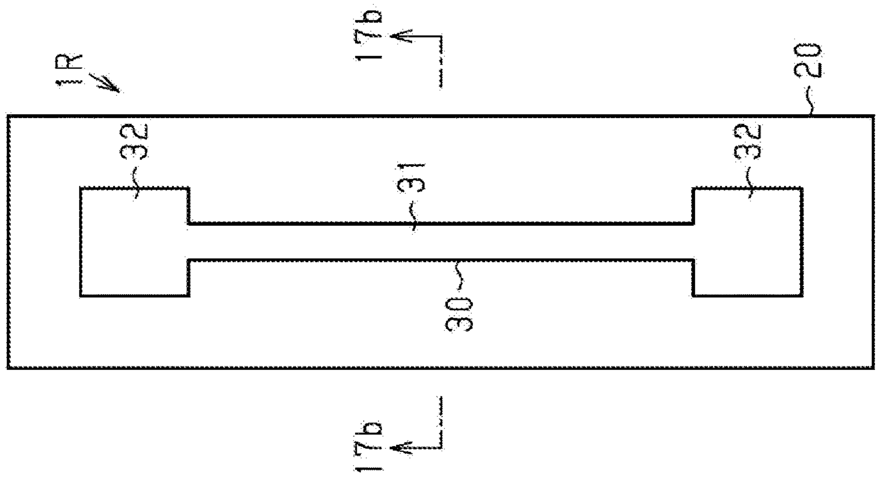
FIG. 17A is a perspective plan view of an inductor component of a modification.
Figure 17B:
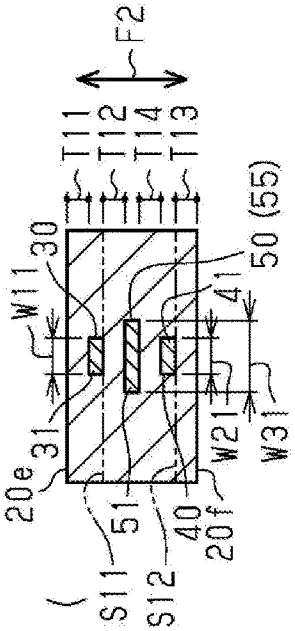
FIG. 17B is a cross-sectional view of the inductor component (a cross-sectional view taken along a line 17*b*-17*b* in FIG. 17A)

An inductor component 1R illustrated in FIG. 17A and FIG. 17B includes the main body 20, the first inductor wiring 30 located on a first virtual plane S11 inside the main body 20, and the second inductor wiring 40 extending in parallel to the first virtual plane S11 inside the main body 20. Further, the inductor component 1R has a third inductor wiring 50 that is located between the first inductor wiring 30 and the second inductor wiring 40 inside the main body 20 and extends in parallel to the first virtual plane S11. Further, the inductor component 1R includes vertical wirings extending from each of the first to third inductor wirings 30, 40, and 50, and passing through the main body 20 in a direction perpendicular to the first virtual plane S11.

In FIG. 17A, a portion of the inductor component 1R located above the first inductor wiring 30 is omitted. The second inductor wiring 40 is located on a second virtual plane S12 parallel to the first virtual plane S11. The third inductor wiring 50 is located between the first virtual plane S11 and the second virtual plane S12, and is aligned with the first inductor wiring 30 and the second inductor wiring 40 along the arrangement direction F2 of the first and second inductor wirings 30 and 40. That is, the first to third inductor wirings 30, 40, and 50 are arranged in the direction perpendicular to the first virtual plane S11.

The first to third inductor wirings 30, 40, and 50 are stacked in the direction perpendicular to the first virtual plane S11 (in the vertical direction in FIG. 17B), and are aligned at equal intervals in the direction perpendicular to the first virtual plane S11. Therefore, the arrangement direction F2 of the first to third inductor wirings 30, 40, and 50 is the direction perpendicular to the first virtual plane S11. Further, although an illustration is partially omitted, the first connection portion 32 of the first inductor wiring 30, the second connection portion of the second inductor wiring 40, and the third connection portion of the third inductor wiring 50 are located at positions shifted in the planar direction of the first virtual plane S11. Then, a vertical wiring (not illustrated) extends from each of the first to third connection portions to the front surface of the main body 20, and the vertical wiring passes through the main body 20 in the arrangement direction F2 and is exposed to the outside of the main body 20. When an end surface on the first inductor wiring 30 side of both end surfaces of the main body 20 in the arrangement direction F2 is referred to as a first end surface 20*e*, and when an end surface on the second inductor wiring 40 side is referred to as a second end surface 20*f*, the vertical wiring is exposed to the outside of the main body 20 from the first end surface 20*e*, for example. The vertical wiring is the same as the first to third vertical wirings 61 to 63 of the above-described embodiment. An end surface of the vertical wiring exposed to the outside of the main body 20 is covered with an external terminal (not illustrated). However, the end surface of the vertical wiring exposed to the outside of the main body 20 may not necessarily be covered with the external terminal.

The third inductor wiring 50 is the low-resistance inductor wiring 55 having a DC electrical resistance smaller than those of the first inductor wiring 30 and the second inductor wiring 40. In the present example, the thicknesses of the first to third inductor wirings 30, 40, and 50 are equal to each other. Further, the wiring width W11 of the first wiring portion 31 of the first inductor wiring 30 is equal to the wiring width W21 of the second wiring portion 41 of the second inductor wiring 40. The wiring width W31 of the third wiring portion 51 of the third inductor wiring 50 is larger than the wiring widths W11 and W21 of the first and second wiring portions 31, and 41. As a result, the DC electrical resistance of the third inductor wiring 50 becomes smaller than the DC electrical resistances of the first and second inductor wirings 30, and 40. The method of making the DC electrical resistance of the third inductor wiring 50, which is the low-resistance inductor wiring 55, smaller than the DC electrical resistances of the first and second inductor wirings 30 and 40 is not limited to this, and the method described in the above-described modification may be used.

According to the above configuration, the same effects as in 1-1, 1-2, 1-3, and 1-5 of the above-described first embodiment can be obtained.

Further, in the present example, a distance T11 between the first end surface 20*e* adjacent to the first inductor wiring 30 and the first wiring portion 31 can be made shorter than a distance T12 between the third wiring portion 51 of the third inductor wiring 50 that is the low-resistance inductor wiring 55 adjacent to the first inductor wiring 30 and the first wiring portion 31. Further, a distance T13 between the second end surface 20*f* adjacent to the second inductor wiring 40 and the second wiring portion 41 can be made shorter than a distance T14 between the third wiring portion 51 of the third inductor wiring 50 that is the low-resistance inductor wiring 55 adjacent to the second inductor wiring 40 and the second wiring portion 41. In this case, it is possible to obtain the same operation and effect as in 1-4 of the above-described first embodiment.

Note that, in the inductor component 1R, a fourth inductor wiring, which is a low-resistance inductor wiring, may be disposed between the second inductor wiring 40 and the third inductor wiring 50. Further, a fifth inductor wiring, which is a low-resistance inductor wiring, may be disposed between the first inductor wiring 30 and the third inductor wiring 50. Even in this case, heat generation is suppressed in the vicinity of the low-resistance inductor wiring 55, and thus it is possible to suppress a decrease in reliability due to heat.

The inductor component may be configured to include a plurality of inductor wirings aligned in a matrix form.

Figure 18A:
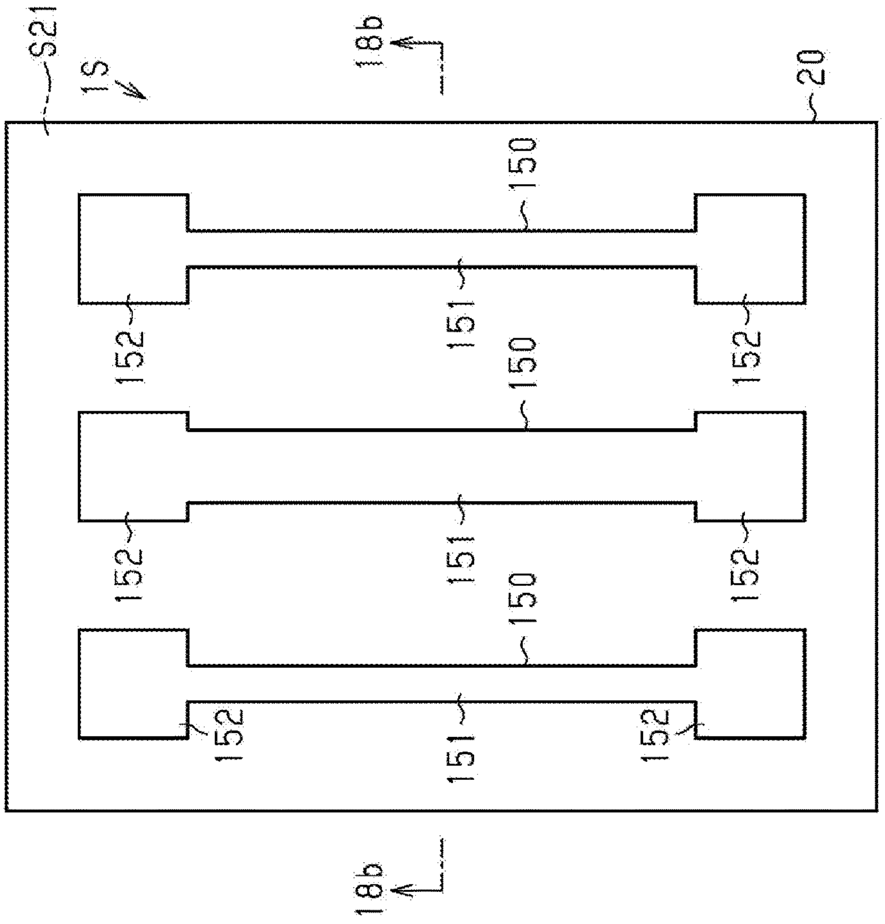
FIG. 18A is a perspective plan view of an inductor component of a modification.
Figure 18B:
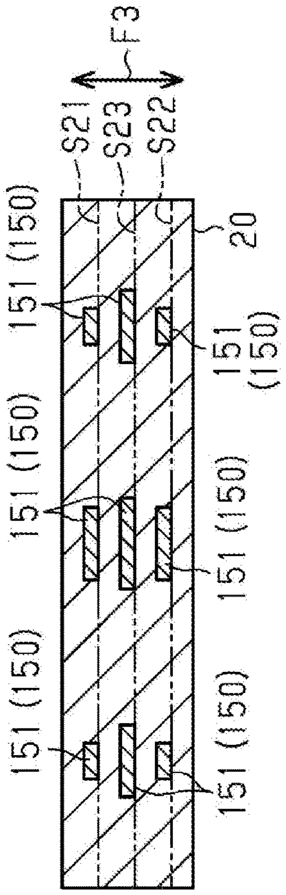
FIG. 18B is a cross-sectional view of the inductor component (a cross-sectional view taken along a line 18*b*-18*b* in FIG. 18A)

For example, an inductor component 1S illustrated in FIG. 18A and FIG. 18B includes the main body 20, a plurality of inductor wirings 150 aligned in a matrix having rows and columns form inside the main body 20, and vertical wirings passing through the inside of the main body 20 from each of the inductor wirings 150 to the surface of the main body 20 in a column arrangement direction F3 of the inductor wirings 150 in each of the columns. In each of the columns, equal to or more than three inductor wirings 150 are arranged, and the inductor wiring closer to an intermediate position of two inductor wirings 150 located at both ends of the row has a smaller DC electrical resistance. Further, in each of the rows, equal to or more than three inductor wirings 150 are arranged, and the inductor wiring closer to the intermediate position of two inductor wirings 150 located at both ends of the column has a smaller DC electrical resistance.

The inductor component 1S includes, for example, nine inductor wirings 150 arranged in a matrix form of three rows and three columns. The main body 20 in which the inductor wirings 150 are disposed is, for example, such that four layers of magnetic material layers that are similar to the magnetic material layers 21 and 22 of the above-described embodiments are laminated. Three inductor wirings 150 of the nine inductor wirings 150 are arranged at equal intervals on a first virtual plane S21 inside the main body 20 such that the wiring width direction corresponds to the arrangement direction. Further, another three inductor wirings 150 are arranged at equal intervals on a second virtual plane S22 parallel to the first virtual plane S21 inside the main body 20 such that the wiring width direction corresponds to the arrangement direction. In addition, the remaining three inductor wirings 150 are arranged at equal intervals inside the main body 20 on a third virtual plane S23 parallel to the first virtual plane S21 and located between the first virtual plane S21 and the second virtual plane S22 such that the wiring width direction corresponds to the arrangement direction. Each of the three inductor wirings 150 arranged on each of the virtual planes S21, S22, and S23 configures a row. Note that, among the nine inductor wirings 150, FIG. 18A illustrates only three inductor wirings 150 located on the first virtual plane S21.

In addition, three inductor wirings 150 on the first virtual plane S21, three inductor wirings 150 on the second virtual plane S22, and three inductor wirings 150 on the third virtual plane S23 are stacked such that each three inductor wirings 150 are arranged in the direction perpendicular to the first virtual plane S21. Each of the three inductor wirings 150 arranged in the direction perpendicular to the first virtual plane S21 configures a column. That is, the three inductor wirings 150 configuring the respective columns are arranged in the direction perpendicular to the first virtual plane S21.

Each of the inductor wirings 150 includes a wiring portion 151 and a connection portion 152 provided at both ends of the wiring portion 151. The nine inductor wirings 150 are such that their wiring portions 151 are parallel to each other. The connection portion 152 of each inductor wiring 150 is located at a position shifted in the planar direction of the first virtual plane S21. Further, a vertical wiring (not illustrated) is connected to each of the connection portions 152. The vertical wiring passes through the main body 20 from the connection portion 152 to the surface of the main body 20 in the arrangement direction F3 (the same in the direction perpendicular to the first virtual plane S21 in the present example) of the inductor wiring 150 in each row, and is exposed to the outside of the main body 20. The vertical wiring is the same as the first to fourth vertical wirings 61 to 64 of the above-described embodiments. An end surface of the vertical wiring exposed to the outside of the main body 20 is covered with an external terminal (not illustrated). The external terminal is the same as the first to fourth external terminals 71 to 74 of the above-described embodiments. However, the end surface of the vertical wiring exposed to the outside of the main body 20 may not necessarily be covered with the external terminal.

Among the inductor wirings 150 in each row, the inductor wiring 150 closer to an intermediate position of two inductor wirings 150 located at both ends of the row has a smaller DC electrical resistance. In the present example, respective thicknesses of the inductor wirings 150 are equal to each other. Further, wiring widths (a width in a left-right direction in FIG. 18B) of the wiring portions 151 of the two inductor wirings 150 located at both ends of the row are equal to each other. The inductor wiring 150 at the center of the row has a larger wiring width of the wiring portion 151 than those of the two inductor wirings 150 at both ends of the row. As a result, the inductor wiring 150 at the center of the row has a smaller DC electrical resistance than the two inductor wirings 150 at both ends of the row. Note that the method of making the DC electrical resistance of the inductor wiring 150 at the center of the row smaller than the DC electrical resistance of the two inductor wirings 150 at the both ends of the row is not limited to this, and the method described in the above modifications can be used.

Further, among the inductor wirings 150 in each column, the inductor wiring closer to an intermediate positions of the two inductor wirings 150 located at both ends of the column has a smaller DC electrical resistance. In the present example, the wiring widths of the wiring portions 151 of two inductor wirings 150 at both ends of the column are equal to each other. The inductor wiring 150 at the center of the column has a larger wiring width of the wiring portion 151 than those of the two inductor wirings 150 at both ends of the column. As a result, the inductor wiring 150 at the center of the column has a smaller DC electrical resistance than those of the two inductor wirings 150 at both ends of the column. Note that the method of making the DC electrical resistance of the inductor wiring 150 at the center of the column smaller than the DC electrical resistance of the two inductor wirings 150 at both ends of the column is not limited to this, and the method described in the above modifications can be used.

In this manner, even when the current flows through each of the inductor wirings 150 in each row in the same manner, in the inductor wirings 150 in each row, it is hard to generate heat by the inductor wiring 150 closer to the intermediate position, in which heat particularly tends to be accumulated, of the two inductor wirings 150 located at both ends of the row. Therefore, the temperature of the inductor wiring 150 in each row locally becoming high is suppressed in the vicinity of the inductor wiring 150 located between two inductor wirings 150 located at both ends of the row. As a result, it is possible to suppress a decrease in reliability due to heat.

Further, in the inductor wiring 150 in each row, the temperature becoming high of the inductor wiring 150 is suppressed located between two inductor wirings 150 at both ends of the row, as compared with the two inductor wirings 150 at the both ends of the row. Therefore, in the inductor wiring 150 in each row, the occurrence of electrochemical migration can be suppressed in a connection portion between the vertical wiring connected to the inductor wiring 150 located between two inductor wirings 150 at both ends of the row and the circuit board on which the inductor component 1S is mounted.

Similarly, even when a current flows through each of the inductor wirings 150 in each column in the same manner, in the inductor wirings 150 in each column, heat is hard to be generated by the inductor wiring 150 closer to the intermediate position, in which heat particularly tends to be accumulated, of two inductor wirings 150 located at both ends of the column Thus, in the inductor wirings 150 in each column, the temperature locally becoming high is suppressed in the vicinity of the inductor wiring 150 located between two inductor wirings 150 located at both ends of the column. As a result, it is possible to suppress a decrease in reliability due to heat.

Further, in the inductor wirings 150 in each column, the temperature becoming high of the inductor wiring 150 located between the two inductor wirings 150 at both ends of the column is suppressed as compared with the two inductor wirings 150 at both ends of the column Therefore, in the inductor wirings 150 of each column, it is possible to suppress the occurrence of the electrochemical migration in the connection portion between the vertical wiring connected to the inductor wiring 150 located between two inductor wirings 150 at both ends of the column and the circuit board on which the inductor component 1S is mounted.

In each of the above-described embodiments, the first inductor wiring 30, the second inductor wiring 40, the third inductor wiring 50, and the fourth inductor wiring 50A linearly extend. However, the shape of the inductor wiring is not limited to this, and may be, for example, a spiral wiring. The spiral wiring is a wiring of a curve (two-dimensional curve) extending on a plane (including a virtual plane), and the number of turns drawn by the curve may be more or less than one turn, or may be a wiring partially having a straight-line portion. Further, as the inductor wiring, it is also possible to use a wiring having a known shape such as a meander shape.

In addition, the first to fourth connection portions 32, 42, 52, and 52A may have a substantially rectangular shape, instead of a substantially square shape. Further, the first to fourth connection portions 32, 42, 52, and 52A are not limited to a substantially rectangular shape, and may have a substantially circular shape, a substantially elliptical shape, a substantially polygonal shape, or a combination thereof.

Figure 19A:
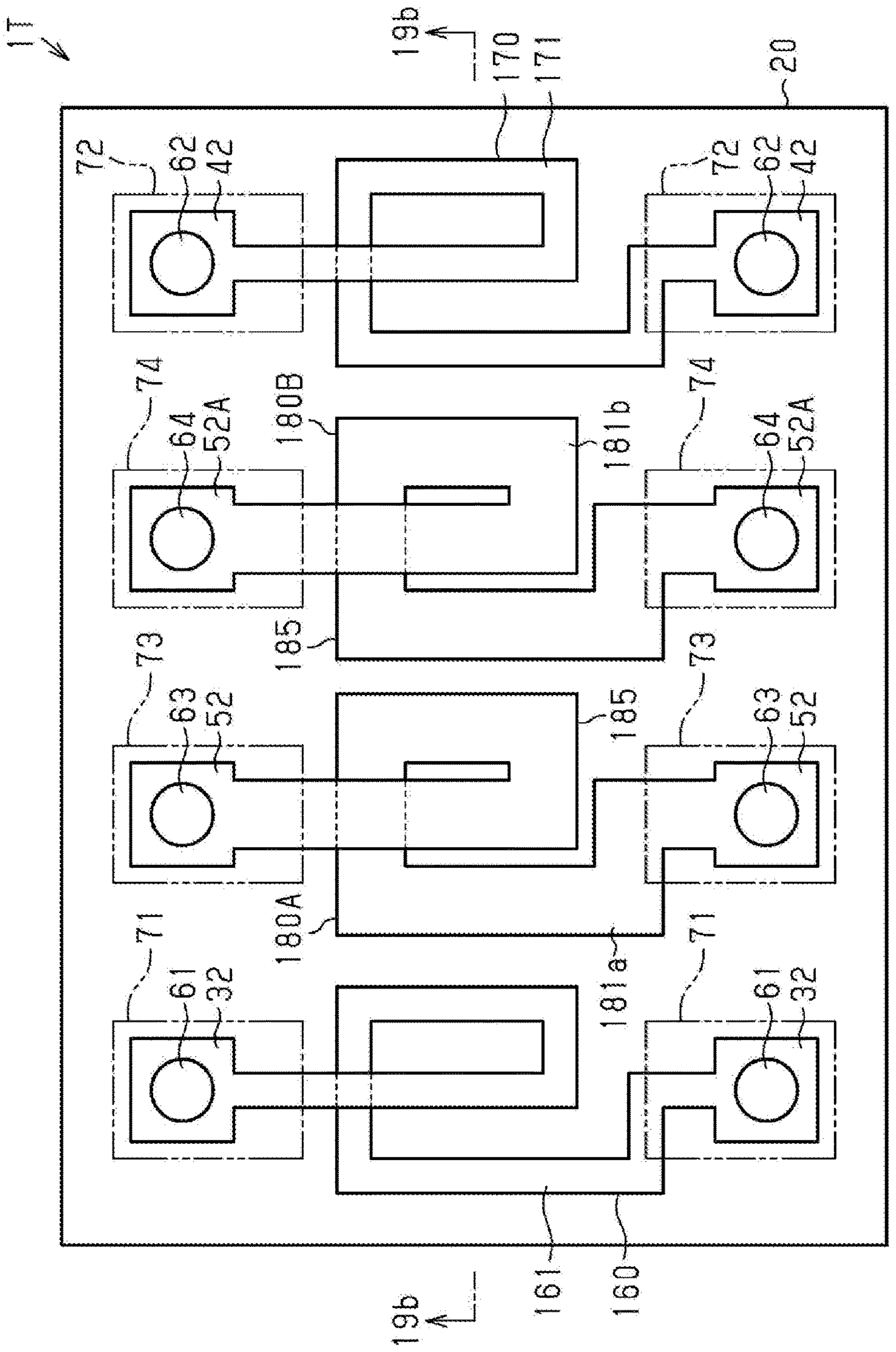
FIG. 19A is a perspective plan view of an inductor component of a modification.
Figure 19B:
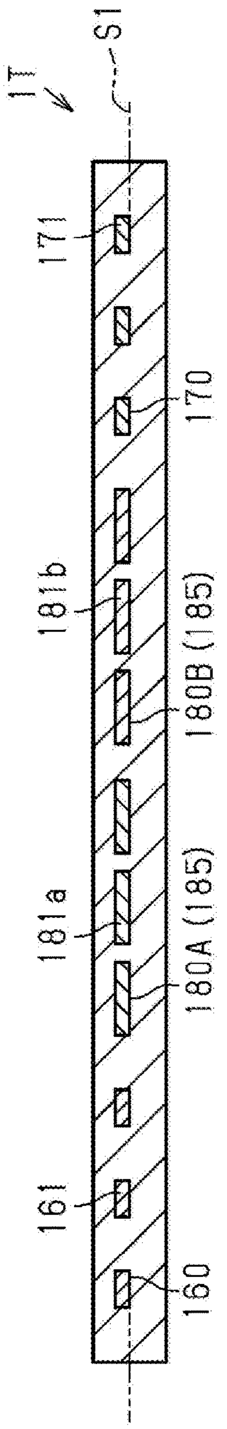
FIG. 19B is a cross-sectional view of the inductor component (a cross-sectional view taken along a line 19*b*-19*b* in FIG. 19A).

For example, first to fourth inductor wirings 160, 170, 180A, and 180B of an inductor component 1T illustrated in FIG. 19A and FIG. 19B are spiral wirings having a shape, which being wound in a substantially spiral shape on the virtual plane S1. Note that, although not illustrated in FIG. 19, the first to fourth inductor wirings 160, 170, 180A, and 180B are formed in two layers so as to appear in a substantially spiral shape when viewed from a direction perpendicular to the virtual plane S1. Specifically, the first to fourth inductor wirings 160, 170, 180A, and 180B are turned once from one end on the virtual plane S1, i.e., in the vicinity of an intersection of the wirings in FIG. 19A, and move to an upper layer or a lower layer through via wirings, and further extend to the other end in the upper layer or the lower layer.

The third inductor wiring 180A located between the first inductor wiring 160 and the second inductor wiring 170 is a low-resistance inductor wiring 185 having a DC electrical resistance smaller than those of the first and second inductor wirings 160 and 170. Further, the fourth inductor wiring 180B located between the second inductor wiring 170 and the third inductor wiring 180A is a low-resistance inductor wiring 185 having a DC electrical resistance smaller than those of the first and second inductor wirings 160 and 170.

In the present example, the first to fourth inductor wirings 160, 170, 180A, and 180B have the same thickness. A wiring width of a third wiring portion 181*a* of the third inductor wiring 180A is larger than a wiring width of a first wiring portion 161 of the first inductor wiring 160 and a wiring width of a second wiring portion 171 of the second inductor wiring 170. Further, a wiring width of a fourth wiring portion 181*b* of the fourth inductor wiring 180B is larger than the wiring width of the first wiring portion 161 and the wiring width of the second wiring portion 171. As described above, by making the wiring width of the third wiring portion 181*a* and the wiring width of the fourth wiring portion 181*b* larger than the wiring width of the first wiring portion 161 and the wiring width of the second wiring portion 171, the DC electrical resistances of the third and fourth inductor wirings 180A and 180B are made smaller than the DC electrical resistances of the first and second inductor wirings 160 and 170. Therefore, the heat generation of the third and fourth inductor wirings 180A and 180B is suppressed, and therefore, it is possible to suppress a decrease in reliability due to heat.

Note that since the third inductor wiring 180A is the low-resistance inductor wiring 185, the third wiring portion 181*a* corresponds to an example of the low-resistance wiring portion, and the third connection portion 52 provided at both ends of the third wiring portion 181*a* corresponds to an example of a low-resistance connection portion. Further, since the fourth inductor wiring 180B is the low-resistance inductor wiring 185, the fourth wiring portion 181*b* corresponds to an example of a low-resistance wiring portion, and the fourth connection portion 52A provided at both ends of the fourth wiring portion 181*b* corresponds to an example of a low-resistance connection portion.

In each of the above embodiments, the magnetic material layers 21 and 22 may be made of an insulating resin containing magnetic powder, such as metal magnetic powder or ferrite powder. In this case, an insulating layer having an electrical insulating property may be further provided between the surfaces of the first to fourth inductor wirings 30, 40, 50, and 50A and the main body 20. Further, the main body 20 does not necessarily include the magnetic material layers 21 and 22. The main body 20 may not include the magnetic material layers 21 and 22, and may be made by laminating a non-magnetic sintered body such as a non-magnetic ferrite, glass, or alumina, an insulating layer made of a non-magnetic insulating resin that does not contain a magnetic material, or an epoxy resin that contains a silica filler, for example. Also in the inductor component having such the main body 20, it is possible to suppress a decrease in reliability due to heat.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:
a main body;
a first inductor wiring located inside the main body and extending on a virtual plane;
a second inductor wiring located inside the main body and extending in parallel to the virtual plane;
a third inductor wiring located between the first inductor wiring and the second inductor wiring inside the main body and extending in parallel to the virtual plane, the third inductor wiring being a low-resistance inductor wiring, and the low-resistance inductor wiring having a DC electrical resistance smaller than DC electrical resistances of the first inductor wiring and the second inductor wiring; and
vertical wirings passing through an inside of the main body from each of the first to third inductor wirings to a surface of the main body in a direction perpendicular to the virtual plane, the vertical wirings being surrounded by respective connection portions, and the vertical wirings and the connection portions being spaced from edges of the main body.

2. The inductor component according to claim 1, wherein at least a part of the low-resistance inductor wiring has a cross-sectional area larger than cross-sectional areas of the first inductor wiring and the second inductor wiring.

3. The inductor component according to claim 2, wherein at least a part of the low-resistance inductor wiring has a wiring width larger than wiring widths of the first inductor wiring and the second inductor wiring.

4. The inductor component according to claim 1, wherein at least a part of the low-resistance inductor wiring has a wiring width larger than wiring widths of the first inductor wiring and the second inductor wiring.

5. The inductor component according to claim 1, further comprising:

a fourth inductor wiring located between the second inductor wiring and the third inductor wiring inside the main body and extending in parallel to the virtual plane, wherein the fourth inductor wiring is the low-resistance inductor wiring.

6. The inductor component according to claim 5, further comprising:

a fifth inductor wiring located between the first inductor wiring and the third inductor wiring inside the main body and extending in parallel to the virtual plane, wherein the fifth inductor wiring is the low-resistance inductor wiring, and the third inductor wiring has a DC electrical resistance smaller than DC electrical resistances of the fourth inductor wiring and the fifth inductor wiring.

7. The inductor component according to claim 5, wherein the first inductor wiring includes a first wiring portion and first connection portions provided at both ends of the first wiring portion and connected to the corresponding vertical wiring, the second inductor wiring includes a second wiring portion and second connection portions provided at both ends of the second wiring portion and connected to the corresponding vertical wiring, each of a plurality of the low-resistance inductor wirings located between the first inductor wiring and the second inductor wiring includes a low-resistance wiring portion and low-resistance connection portions provided at both ends of the low-resistance wiring portion and connected to the corresponding vertical wiring, and the low-resistance inductor wiring closer to an intermediate position between the first wiring portion and the second wiring portion has a larger cross-sectional area of the low-resistance wiring portion.

8. The inductor component according to claim 5, wherein first inductor wiring includes a first wiring portion and first connection portions provided at both ends of the first wiring portion and connected to the corresponding vertical wiring, the second inductor wiring includes a second wiring portion and second connection portions provided at both ends of the second wiring portion and connected to the corresponding vertical wiring, the third inductor wiring includes a third wiring portion and third connection portions provided at both ends of the third wiring portion and connected to the corresponding vertical wiring, the fourth inductor wiring includes a fourth wiring portion and fourth connection portions provided at both ends of the fourth wiring portion and connected to the corresponding vertical wiring, the first wiring portion and the second wiring portion have wiring widths equal to each other, and the fourth wiring portion is closer to the second wiring portion than the fourth connection portions.

9. The inductor component according to claim 1, wherein the first inductor wiring includes a first wiring portion and first connection portions provided at both ends of the first wiring portion and connected to the corresponding vertical wiring, the second inductor wiring includes a second wiring portion and second connection portions provided at both ends of the second wiring portion and connected to the corresponding vertical wiring, the low-resistance inductor wiring includes a low-resistance wiring portion and low-resistance connection portions provided at both ends of the low-resistance wiring portion and connected to the corresponding vertical wiring, and when among both end surfaces of the main body in an arrangement direction of the first to third inductor wiring, an end surface on the first inductor wiring side is referred to as a first end surface, and an end surface on the second inductor wiring side is referred to as a second end surface, a distance between the first end surface and the first wiring portion is shorter than a distance between the low-resistance wiring portion of the low-resistance inductor wiring adjacent to the first inductor wiring and the first wiring portion, and a distance between the second end surface and the second wiring portion is shorter than a distance between the low-resistance wiring portion of the low-resistance inductor wiring adjacent to the second inductor wiring and the second wiring portion.

10. The inductor component according to claim 1, wherein the low-resistance inductor wiring has a line length shorter than line lengths of the first inductor wiring and the second inductor wiring.

11. The inductor component according to claim 1, wherein the low-resistance inductor wiring includes a low-resistance wiring portion and low-resistance connection portions provided at both ends of the low-resistance wiring portion and connected to the corresponding vertical wiring, and the low-resistance wiring portion is configured of a plurality of parallel wirings electrically connected in parallel between the low-resistance connection portions.

12. The inductor component according to claim 11, wherein the second inductor wiring extends on the virtual plane, and one of the plurality of parallel wirings is a main wiring extending on the virtual plane, and remaining parallel wirings are a sub-wiring extending in parallel to the virtual plane on another plane different from the virtual plane.

13. The inductor component according to claim 12, wherein the sub-wiring is located at a position overlapping the main wiring in a direction perpendicular to the virtual plane.

14. The inductor component according to claim 1, wherein the vertical wiring connected to the low-resistance inductor wiring has a cross-sectional area larger than a cross-sectional areas of the vertical wiring connected to the first inductor wiring and the vertical wiring connected to the second inductor wiring.

15. The inductor component according to claim 1, further comprising:

external terminals exposed to an outside and connected to the low-resistance inductor wiring through the vertical wirings, on each of an upper surface and a lower surface parallel to the virtual plane of the main body.

16. The inductor component according to claim 1, further comprising:

a dummy terminal exposed to an outside and not electrically connected to any of the vertical wirings, on at least one of an upper surface and a lower surface parallel to the virtual plane of the main body.

17. The inductor component according to claim 1, wherein the main body is a sintered body.

18. The inductor component according to claim 1, wherein the main body includes a magnetic material layer made of an insulating resin containing magnetic powder.

19. The inductor component according to claim 1, wherein the first to third inductor wirings are arranged in a direction perpendicular to the virtual plane.

20. An inductor component comprising:

a main body;

inductor wirings aligned in a matrix having rows and columns form inside the main body; and vertical wirings passing through an inside of the main body from each of the inductor wirings to a surface of the main body in a column arrangement direction of the inductor wiring in each of the columns, wherein in each of the rows, three or more of the inductor wirings are arranged, such that the inductor wiring closer to an intermediate position between the two inductor wirings located at both ends of the row has a smaller DC electrical resistance, and in each of the columns, three or more inductor wirings are arranged, such that the inductor wiring closer to an intermediate position between the two inductor wirings located at both ends of the column has a smaller DC electrical resistance.

* * * * *